(12) United States Patent
Bhatt et al.

(10) Patent No.: US 12,315,189 B2
(45) Date of Patent: May 27, 2025

(54) ESTIMATION OF HUMAN LOCATIONS IN TWO-DIMENSIONAL COORDINATES USING MACHINE LEARNING

(71) Applicant: Hewlett-Packard Development Company, L.P., Spring, TX (US)

(72) Inventors: Rajen Bhatt, Pittsburgh, PA (US); Jian David Wang, Vancouver (CA)

(73) Assignee: Hewlett-Packard Development Company, L.P., Spring, TX (US)

( * ) Notice: Subject to any disclaimer, the term of this patent is extended or adjusted under 35 U.S.C. 154(b) by 196 days.

(21) Appl. No.: 17/971,564

(22) Filed: Oct. 22, 2022

(65) Prior Publication Data

US 2024/0185449 A1 Jun. 6, 2024

(51) Int. Cl.

| | |
|---|---|
| *G06T 7/73* | (2017.01) |
| *G06T 7/50* | (2017.01) |
| *G06V 10/22* | (2022.01) |
| *G06V 10/44* | (2022.01) |
| *G06V 10/75* | (2022.01) |
| *G06V 40/10* | (2022.01) |
| *H04N 7/15* | (2006.01) |

(52) U.S. Cl.
CPC ............... *G06T 7/73* (2017.01); *G06T 7/50* (2017.01); *G06V 10/225* (2022.01); *G06V 10/44* (2022.01); *G06V 10/751* (2022.01); *G06V 40/10* (2022.01); *H04N 7/15* (2013.01)

(58) Field of Classification Search
CPC ........... G06T 7/73; G06T 7/50; G06V 10/225; G06V 10/44; G06V 10/751; G06V 40/10; G06V 10/82; G06V 20/52; H04N 7/15
See application file for complete search history.

(56) References Cited

U.S. PATENT DOCUMENTS

| | | | |
|---|---|---|---|
| 8,767,975 B2 | 7/2014 | Short | |
| 10,510,361 B2 | 12/2019 | Nomura | |
| 2022/0129682 A1* | 4/2022 | Tang | ......................... G06T 7/74 |
| 2023/0081717 A1* | 3/2023 | Hoang | ................... H04N 7/147 |
| | | | 348/14.08 |

OTHER PUBLICATIONS

M. T. A. Shoani et al., Determining subject distance based on face size, 2015 10th Asian Control Conference (ASCC), May 31, 2015-Jun. 3, 2015, pp. 1-6, doi: 10.1109/ASCC.2015.7244491, Abstract.

(Continued)

*Primary Examiner* — Phung-Hoang J Nguyen
(74) *Attorney, Agent, or Firm* — Quarles & Brady LLP

(57) ABSTRACT

A video conference call system is provided with a camera to generate an input frame image of a conference room, where the video conference call system detects a human head for each meeting participant captured in the input frame image by applying a machine learning human head detector model to said input image frame, generates a head bounding box which surrounds each detected human head and identifies a corresponding meeting participant, extracts a pixel width measure and pixel height measure from each head bounding box, and applies the extracted pixel width measure and pixel height measure to one or more reverse lookup tables to extract meeting room coordinates for each meeting participant identified by a corresponding head bounding box.

13 Claims, 15 Drawing Sheets

(56) References Cited

OTHER PUBLICATIONS

Burgos-Artizzu et al., Distance Estimation of an Unknown Person from a Portrait. In: Fleet, D., Pajdla, T., Schiele, B., Tuytelaars, T. (eds) Computer Vision—ECCV 2014. ECCV 2014. Lecture Notes in Computer Science, vol. 8689. Springer, Cham. https://doi.org/10.1007/978-3-319-10590-1_21.

Rene Ranftl et al., Towards Robust Monocular Depth Estimation: Mixing Datasets for Zero-shot Cross-dataset Transfer, IEEE Transactions on Pattern Analysis and Machine Intelligence, vol. 44, No. 3, pp. 1623-1637, Mar. 1, 2022, doi: 10.1109/TPAMI.2020.3019967.

Anonymous, Estimation of Distance of People from Video Camera without Dedicated Depth Sensors, Technical Disclosure Commons, Defensive Publications Series, Aug. 7, 2022.

\* cited by examiner

| WIDTH FROM CAMERA ($X_{ROOM}$) \ DEPTH FROM CAMERA ($Y_{ROOM}$) | 0 | 0.5 | 1 | 1.5 | 2 | 2.5 | 3 | 3.5 | 4 | 4.5 | 5 | 5.5 | 6 | 6.5 | 7 | 7.5 | 8 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 0.5 | 0 | 45 | 26.57 | 18.43 | 14.04 | 11.31 | 9.46 | 8.13 | 7.13 | 6.34 | 5.71 | 5.19 | 4.76 | 4.4 | 4.09 | 3.81 | 3.58 |
| 1 | 0 | 63.43 | 45 | 33.69 | 26.57 | 21.8 | 18.43 | 15.95 | 14.04 | 12.53 | 11.31 | 10.3 | 9.46 | 8.75 | 8.13 | 7.59 | 7.13 |
| 1.5 | 0 | 71.57 | 56.31 | 45 | 36.87 | 30.96 | 26.57 | 23.2 | 20.56 | 18.43 | 16.7 | 15.26 | 14.04 | 12.99 | 12.09 | 11.31 | 10.62 |
| 2 | 0 | 75.96 | 63.43 | 53.13 | 45 | 38.66 | 33.69 | 29.74 | 26.57 | 23.96 | 21.8 | 19.98 | 18.43 | 17.1 | 15.95 | 14.93 | 14.04 |
| 2.5 | 0 | 78.69 | 68.2 | 59.04 | 51.34 | 45 | 39.81 | 35.54 | 32.01 | 29.05 | 26.57 | 24.44 | 22.62 | 21.04 | 19.65 | 18.43 | 17.35 |
| 3 | 0 | 80.54 | 71.57 | 63.43 | 56.31 | 50.19 | 45 | 40.6 | 36.87 | 33.69 | 30.96 | 28.61 | 26.57 | 24.78 | 23.2 | 21.8 | 20.56 |
| 3.5 | 0 | 81.87 | 74.05 | 66.8 | 60.26 | 54.46 | 49.4 | 45 | 41.19 | 37.87 | 34.99 | 32.47 | 30.26 | 28.3 | 26.57 | 25.02 | 23.63 |
| 4 | 0 | 82.87 | 75.96 | 69.44 | 63.43 | 57.99 | 53.13 | 48.81 | 45 | 41.63 | 38.66 | 36.03 | 33.69 | 31.61 | 29.74 | 28.07 | 26.57 |
| 4.5 | 0 | 83.66 | 77.47 | 71.57 | 66.04 | 60.95 | 56.31 | 52.13 | 48.37 | 45 | 41.99 | 39.29 | 36.87 | 34.7 | 32.74 | 30.96 | 29.36 |
| 5 | 0 | 84.29 | 78.69 | 73.3 | 68.2 | 63.43 | 59.04 | 55.01 | 51.34 | 48.01 | 45 | 42.27 | 39.81 | 37.57 | 35.54 | 33.69 | 32.01 |
| 5.5 | 0 | 84.81 | 79.7 | 74.74 | 70.02 | 65.56 | 61.39 | 57.53 | 53.97 | 50.71 | 47.73 | 45 | 42.51 | 40.24 | 38.16 | 36.25 | 34.51 |
| 6 | 0 | 85.24 | 80.54 | 75.96 | 71.57 | 67.38 | 63.43 | 59.74 | 56.31 | 53.13 | 50.19 | 47.49 | 45 | 42.71 | 40.6 | 38.66 | 36.87 |
| 6.5 | 0 | 85.6 | 81.25 | 77.01 | 72.9 | 68.96 | 65.22 | 61.7 | 58.39 | 55.3 | 52.43 | 49.76 | 47.29 | 45 | 42.88 | 40.91 | 39.09 |
| 7 | 0 | 85.91 | 81.87 | 77.91 | 74.05 | 70.35 | 66.8 | 63.43 | 60.26 | 57.26 | 54.46 | 51.84 | 49.4 | 47.12 | 45 | 43.03 | 41.19 |
| 7.5 | 0 | 86.19 | 82.41 | 78.69 | 75.07 | 71.57 | 68.2 | 64.98 | 61.93 | 59.04 | 56.31 | 53.75 | 51.34 | 49.09 | 46.97 | 45 | 43.15 |
| 8 | 0 | 86.42 | 82.87 | 79.38 | 75.96 | 72.65 | 69.44 | 66.37 | 63.43 | 60.64 | 57.99 | 55.49 | 53.13 | 50.91 | 48.81 | 46.85 | 45 |

PAN ANGLE VALUES ($\emptyset_{PAN}$) 31

FIG. 3

| WIDTH FROM CAMERA ($X_{ROOM}$) \ DEPTH FROM CAMERA ($Y_{ROOM}$) | 0.5 | 1 | 1.5 | 2 | 2.5 | 3 | 3.5 | 4 | 4.5 | 5 | 5.5 | 6 | 6.5 | 7 | 7.5 | 8 |
|---|---|---|---|---|---|---|---|---|---|---|---|---|---|---|---|---|
| 0 | 25.4 | 12.8 | 8.6 | 6.4 | 5.2 | 4.3 | 3.7 | 3.2 | 2.9 | 2.6 | 2.3 | 2.1 | 2 | 1.8 | 1.7 | 1.6 |
| 0.5 | 18.1 | 11.5 | 8.1 | 6.2 | 5.1 | 4.2 | 3.6 | 3.2 | 2.8 | 2.6 | 2.3 | 2.1 | 2 | 1.8 | 1.7 | 1.6 |
| 1 | 11.5 | 9.1 | 7.1 | 5.8 | 4.8 | 4.1 | 3.5 | 3.1 | 2.8 | 2.5 | 2.3 | 2.1 | 2 | 1.8 | 1.7 | 1.6 |
| 1.5 | 8.1 | 7.1 | 6.1 | 5.2 | 4.4 | 3.8 | 3.4 | 3 | 2.7 | 2.5 | 2.3 | 2.1 | 1.9 | 1.8 | 1.7 | 1.6 |
| 2 | 6.2 | 5.8 | 5.2 | 4.6 | 4 | 3.6 | 3.2 | 2.9 | 2.6 | 2.4 | 2.2 | 2 | 1.9 | 1.8 | 1.6 | 1.6 |
| 2.5 | 5.1 | 4.8 | 4.4 | 4 | 3.6 | 3.3 | 3 | 2.7 | 2.5 | 2.3 | 2.1 | 2 | 1.8 | 1.7 | 1.6 | 1.5 |
| 3 | 4.2 | 4.1 | 3.8 | 3.6 | 3.3 | 3 | 2.8 | 2.6 | 2.4 | 2.2 | 2.1 | 1.9 | 1.8 | 1.7 | 1.6 | 1.5 |
| 3.5 | 3.6 | 3.5 | 3.4 | 3.2 | 3 | 2.8 | 2.6 | 2.4 | 2.3 | 2.1 | 2 | 1.8 | 1.7 | 1.6 | 1.5 | 1.4 |
| 4 | 3.2 | 3.1 | 3 | 2.9 | 2.7 | 2.6 | 2.4 | 2.3 | 2.1 | 2 | 1.9 | 1.7 | 1.6 | 1.5 | 1.4 | 1.4 |
| 4.5 | 2.8 | 2.8 | 2.7 | 2.6 | 2.5 | 2.4 | 2.3 | 2.1 | 2 | 1.9 | 1.8 | 1.7 | 1.6 | 1.5 | 1.4 | 1.3 |
| 5 | 2.6 | 2.5 | 2.5 | 2.4 | 2.3 | 2.2 | 2.1 | 2 | 1.9 | 1.8 | 1.7 | 1.6 | 1.5 | 1.4 | 1.4 | 1.3 |
| 5.5 | 2.3 | 2.3 | 2.3 | 2.2 | 2.1 | 2 | 2 | 1.9 | 1.8 | 1.7 | 1.6 | 1.5 | 1.5 | 1.4 | 1.3 | 1.3 |
| 6 | 2.1 | 2.1 | 2.1 | 2 | 2 | 1.9 | 1.9 | 1.8 | 1.7 | 1.7 | 1.6 | 1.5 | 1.4 | 1.4 | 1.3 | 1.2 |
| 6.5 | 2 | 2 | 1.9 | 1.9 | 1.8 | 1.8 | 1.7 | 1.7 | 1.6 | 1.6 | 1.5 | 1.4 | 1.3 | 1.3 | 1.3 | 1.2 |
| 7 | 1.8 | 1.8 | 1.8 | 1.7 | 1.7 | 1.7 | 1.6 | 1.6 | 1.5 | 1.5 | 1.4 | 1.4 | 1.3 | 1.3 | 1.2 | 1.2 |
| 7.5 | 1.7 | 1.7 | 1.7 | 1.7 | 1.6 | 1.6 | 1.6 | 1.5 | 1.5 | 1.4 | 1.4 | 1.3 | 1.3 | 1.3 | 1.3 | 1.2 |
| 8 | 1.6 | 1.6 | 1.6 | 1.6 | 1.5 | 1.5 | 1.5 | 1.4 | 1.4 | 1.4 | 1.3 | 1.3 | 1.3 | 1.2 | 1.2 | 1.1 |

ANGULAR EXTENT (VERTICAL 101) HEAD DIMENSION, ($\theta_{FRAME\_V}$)

FIG. 10

| | \ DEPTH FROM CAMERA ($Y_{ROOM}$) | | | | | | | | | | | | | | | |
|---|---|---|---|---|---|---|---|---|---|---|---|---|---|---|---|---|
| | | 0.5 | 1 | 1.5 | 2 | 2.5 | 3 | 3.5 | 4 | 4.5 | 5 | 5.5 | 6 | 6.5 | 7 | 7.5 | 8 |
| WIDTH FROM CAMERA ($X_{ROOM}$) | 0 | 33.9% | 17.1% | 11.5% | 8.5% | 6.9% | 5.7% | 4.9% | 4.3% | 3.9% | 3.5% | 3.1% | 2.8% | 2.7% | 2.4% | 2.3% | 2.1% |
| | 0.5 | 24.1% | 15.3% | 10.8% | 8.3% | 6.8% | 5.6% | 4.8% | 4.3% | 3.7% | 3.5% | 3.1% | 2.8% | 2.7% | 2.4% | 2.3% | 2.1% |
| | 1 | 15.3% | 12.1% | 9.5% | 7.7% | 6.4% | 5.5% | 4.7% | 4.1% | 3.7% | 3.3% | 3.1% | 2.8% | 2.7% | 2.4% | 2.3% | 2.1% |
| | 1.5 | 10.8% | 9.5% | 8.1% | 6.9% | 5.9% | 5.1% | 4.5% | 4.0% | 3.6% | 3.2% | 3.1% | 2.8% | 2.5% | 2.4% | 2.3% | 2.1% |
| | 2 | 8.3% | 7.7% | 6.9% | 6.1% | 5.3% | 4.8% | 4.3% | 3.9% | 3.5% | 3.2% | 2.9% | 2.7% | 2.5% | 2.4% | 2.3% | 2.1% |
| | 2.5 | 6.8% | 6.4% | 5.9% | 5.3% | 4.8% | 4.4% | 4.0% | 3.6% | 3.3% | 3.1% | 2.8% | 2.7% | 2.5% | 2.3% | 2.1% | 2.0% |
| | 3 | 5.6% | 5.5% | 5.1% | 4.8% | 4.4% | 4.0% | 3.7% | 3.5% | 3.2% | 2.9% | 2.8% | 2.5% | 2.4% | 2.3% | 2.1% | 2.0% |
| | 3.5 | 4.8% | 4.7% | 4.5% | 4.3% | 4.0% | 3.7% | 3.5% | 3.2% | 3.1% | 2.8% | 2.7% | 2.5% | 2.3% | 2.1% | 2.1% | 2.0% |
| | 4 | 4.3% | 4.1% | 4.0% | 3.9% | 3.6% | 3.5% | 3.2% | 3.1% | 2.8% | 2.7% | 2.5% | 2.4% | 2.3% | 2.1% | 2.0% | 1.9% |
| | 4.5 | 3.7% | 3.7% | 3.6% | 3.5% | 3.3% | 3.2% | 3.1% | 2.8% | 2.7% | 2.5% | 2.4% | 2.3% | 2.1% | 2.0% | 2.0% | 1.9% |
| | 5 | 3.5% | 3.3% | 3.3% | 3.2% | 3.1% | 2.9% | 2.8% | 2.7% | 2.5% | 2.4% | 2.3% | 2.1% | 2.0% | 2.0% | 1.9% | 1.9% |
| | 5.5 | 3.1% | 3.1% | 3.1% | 2.9% | 2.8% | 2.8% | 2.7% | 2.5% | 2.4% | 2.3% | 2.1% | 2.0% | 2.0% | 1.9% | 1.9% | 1.7% |
| | 6 | 2.8% | 2.8% | 2.8% | 2.7% | 2.7% | 2.5% | 2.5% | 2.4% | 2.3% | 2.3% | 2.1% | 2.0% | 2.0% | 1.9% | 1.7% | 1.7% |
| | 6.5 | 2.7% | 2.7% | 2.5% | 2.5% | 2.5% | 2.4% | 2.3% | 2.3% | 2.1% | 2.1% | 2.0% | 1.9% | 1.7% | 1.7% | 1.7% | 1.7% |
| | 7 | 2.4% | 2.4% | 2.4% | 2.4% | 2.3% | 2.3% | 2.1% | 2.1% | 2.0% | 2.0% | 1.9% | 1.7% | 1.7% | 1.7% | 1.7% | 1.6% |
| | 7.5 | 2.3% | 2.3% | 2.3% | 2.3% | 2.1% | 2.1% | 2.1% | 2.0% | 2.0% | 1.9% | 1.7% | 1.7% | 1.7% | 1.6% | 1.6% | 1.6% |
| | 8 | 2.1% | 2.1% | 2.1% | 2.1% | 2.0% | 2.0% | 2.0% | 1.9% | 1.9% | | | | | | | 1.5% |

DEPTH FROM CAMERA ($Y_{ROOM}$)

| WIDTH FROM CAMERA ($X_{ROOM}$) | 0.5 | 1 | 1.5 | 2 | 2.5 | 3 | 3.5 | 4 | 4.5 | 5 | 5.5 | 6 | 6.5 | 7 | 7.5 | 8 |
|---|---|---|---|---|---|---|---|---|---|---|---|---|---|---|---|---|
| 0 | 732 | 369 | 248 | 184 | 149 | 123 | 106 | 93 | 84 | 76 | 67 | 60 | 58 | 52 | 50 | 45 |
| 0.5 | 521 | 330 | 233 | 179 | 147 | 121 | 104 | 93 | 80 | 76 | 67 | 60 | 58 | 52 | 50 | 45 |
| 1 | 330 | 261 | 205 | 166 | 138 | 119 | 102 | 89 | 80 | 71 | 67 | 60 | 58 | 52 | 50 | 45 |
| 1.5 | 233 | 205 | 175 | 149 | 127 | 110 | 97 | 86 | 78 | 71 | 67 | 60 | 54 | 52 | 50 | 45 |
| 2 | 179 | 166 | 149 | 132 | 114 | 104 | 93 | 84 | 76 | 69 | 63 | 58 | 54 | 52 | 50 | 45 |
| 2.5 | 147 | 138 | 127 | 114 | 104 | 95 | 86 | 78 | 71 | 67 | 60 | 58 | 54 | 50 | 45 | 43 |
| 3 | 121 | 119 | 110 | 104 | 95 | 86 | 80 | 76 | 69 | 63 | 60 | 54 | 52 | 50 | 45 | 43 |
| 3.5 | 104 | 102 | 97 | 93 | 86 | 80 | 76 | 69 | 67 | 60 | 58 | 54 | 50 | 45 | 45 | 43 |
| 4 | 93 | 89 | 86 | 84 | 78 | 76 | 69 | 67 | 60 | 58 | 54 | 52 | 50 | 45 | 43 | 41 |
| 4.5 | 80 | 80 | 78 | 76 | 71 | 69 | 67 | 60 | 58 | 54 | 52 | 50 | 45 | 43 | 43 | 41 |
| 5 | 76 | 71 | 71 | 69 | 67 | 63 | 60 | 58 | 54 | 52 | 50 | 50 | 45 | 43 | 41 | 41 |
| 5.5 | 67 | 67 | 67 | 63 | 60 | 60 | 58 | 54 | 52 | 50 | 50 | 45 | 43 | 41 | 41 | 37 |
| 6 | 60 | 60 | 60 | 58 | 58 | 54 | 54 | 52 | 50 | 50 | 45 | 43 | 43 | 41 | 37 | 37 |
| 6.5 | 58 | 58 | 54 | 54 | 54 | 52 | 50 | 50 | 45 | 45 | 43 | 43 | 41 | 37 | 37 | 37 |
| 7 | 52 | 52 | 52 | 52 | 50 | 50 | 45 | 45 | 43 | 43 | 41 | 41 | 37 | 37 | 37 | 35 |
| 7.5 | 50 | 50 | 50 | 50 | 45 | 45 | 45 | 43 | 43 | 41 | 41 | 37 | 37 | 37 | 35 | 35 |
| 8 | 45 | 45 | 45 | 45 | 43 | 43 | 43 | 41 | 41 | 41 | 37 | 37 | 37 | 35 | 35 | 32 |

NUMBER OF PIXELS FOR VERTICAL HEAD HEIGHT  121 ↗

140

DEPTH FROM CAMERA ($Y_{ROOM}$)

| | 0.5 | 1 | 1.5 | 2 | 2.5 | 3 | 3.5 | 4 | 4.5 | 5 | 5.5 | 6 | 6.5 | 7 | 7.5 | 8 |
|---|---|---|---|---|---|---|---|---|---|---|---|---|---|---|---|---|
| 0 | 15.8 | 8 | 5.3 | 4 | 3.2 | 2.7 | 2.3 | 2 | 1.8 | 1.6 | 1.4 | 1.3 | 1.2 | 1.1 | 1.1 | 1 |
| 0.5 | 7.4 | 6.2 | 4.7 | 3.7 | 3 | 2.6 | 2.2 | 2 | 1.7 | 1.6 | 1.4 | 1.3 | 1.2 | 1.1 | 1.1 | 1 |
| 1 | 3 | 3.8 | 3.6 | 3.1 | 2.7 | 2.4 | 2.1 | 1.9 | 1.7 | 1.5 | 1.4 | 1.3 | 1.2 | 1.1 | 1 | 1 |
| 1.5 | 1.5 | 2.4 | 2.6 | 2.5 | 2.3 | 2.1 | 1.9 | 1.7 | 1.6 | 1.5 | 1.3 | 1.2 | 1.2 | 1.1 | 1 | 1 |
| 2 | 0.9 | 1.5 | 1.9 | 2 | 1.9 | 1.8 | 1.7 | 1.6 | 1.5 | 1.4 | 1.3 | 1.2 | 1.1 | 1 | 1 | 0.9 |
| 2.5 | 0.6 | 1.1 | 1.4 | 1.5 | 1.6 | 1.5 | 1.5 | 1.4 | 1.3 | 1.3 | 1.2 | 1.1 | 1.1 | 1 | 1 | 0.9 |
| 3 | 0.4 | 0.8 | 1 | 1.2 | 1.3 | 1.3 | 1.3 | 1.3 | 1.2 | 1.2 | 1.1 | 1.1 | 1 | 1 | 0.9 | 0.9 |
| 3.5 | 0.3 | 0.6 | 0.8 | 1 | 1.1 | 1.1 | 1.1 | 1.1 | 1.1 | 1.1 | 1 | 1 | 0.9 | 0.9 | 0.9 | 0.8 |
| 4 | 0.2 | 0.5 | 0.6 | 0.8 | 0.9 | 0.9 | 1 | 1 | 1 | 1 | 0.9 | 0.9 | 0.9 | 0.9 | 0.8 | 0.8 |
| 4.5 | 0.2 | 0.4 | 0.5 | 0.6 | 0.7 | 0.8 | 0.8 | 0.9 | 0.9 | 0.9 | 0.9 | 0.8 | 0.8 | 0.8 | 0.8 | 0.8 |
| 5 | 0.2 | 0.3 | 0.4 | 0.5 | 0.6 | 0.7 | 0.7 | 0.8 | 0.8 | 0.8 | 0.8 | 0.8 | 0.8 | 0.7 | 0.7 | 0.7 |
| 5.5 | 0.1 | 0.3 | 0.4 | 0.5 | 0.5 | 0.6 | 0.7 | 0.7 | 0.7 | 0.7 | 0.7 | 0.7 | 0.7 | 0.7 | 0.7 | 0.7 |
| 6 | 0.1 | 0.2 | 0.3 | 0.4 | 0.5 | 0.5 | 0.6 | 0.6 | 0.6 | 0.6 | 0.7 | 0.7 | 0.7 | 0.7 | 0.6 | 0.6 |
| 6.5 | 0.1 | 0.2 | 0.3 | 0.3 | 0.4 | 0.5 | 0.5 | 0.5 | 0.6 | 0.6 | 0.6 | 0.6 | 0.6 | 0.6 | 0.6 | 0.6 |
| 7 | 0.1 | 0.2 | 0.2 | 0.3 | 0.4 | 0.4 | 0.5 | 0.5 | 0.5 | 0.5 | 0.5 | 0.6 | 0.6 | 0.6 | 0.6 | 0.6 |
| 7.5 | 0.1 | 0.1 | 0.2 | 0.3 | 0.3 | 0.4 | 0.4 | 0.4 | 0.5 | 0.5 | 0.5 | 0.5 | 0.5 | 0.5 | 0.5 | 0.5 |
| 8 | 0.1 | 0.1 | 0.2 | 0.2 | 0.3 | 0.3 | 0.4 | 0.4 | 0.4 | 0.4 | 0.5 | 0.5 | 0.5 | 0.5 | 0.5 | 0.5 |

WIDTH FROM CAMERA ($X_{ROOM}$)

ANGULAR EXTENT (HORIZONTAL HEAD DIMENSION, $\theta_{FRAME\_H}$) 141

DEPTH FROM CAMERA ($Y_{ROOM}$)

| | 0.5 | 1 | 1.5 | 2 | 2.5 | 3 | 3.5 | 4 | 4.5 | 5 | 5.5 | 6 | 6.5 | 7 | 7.5 | 8 |
|---|---|---|---|---|---|---|---|---|---|---|---|---|---|---|---|---|
| 0 | 14.1% | 7.1% | 4.7% | 3.6% | 2.9% | 2.4% | 2.1% | 1.8% | 1.6% | 1.4% | 1.3% | 1.2% | 1.1% | 1.0% | 1.0% | 0.9% |
| 0.5 | 6.6% | 5.5% | 4.2% | 3.3% | 2.7% | 2.3% | 2.0% | 1.8% | 1.5% | 1.4% | 1.3% | 1.2% | 1.1% | 1.0% | 1.0% | 0.9% |
| 1 | 2.7% | 3.4% | 3.2% | 2.8% | 2.4% | 2.1% | 1.9% | 1.7% | 1.5% | 1.3% | 1.3% | 1.2% | 1.1% | 1.0% | 0.9% | 0.9% |
| 1.5 | 1.3% | 2.1% | 2.3% | 2.2% | 2.1% | 1.9% | 1.7% | 1.5% | 1.4% | 1.3% | 1.2% | 1.1% | 1.1% | 1.0% | 0.9% | 0.9% |
| 2 | 0.8% | 1.3% | 1.7% | 1.8% | 1.7% | 1.6% | 1.5% | 1.4% | 1.3% | 1.3% | 1.2% | 1.1% | 1.0% | 0.9% | 0.9% | 0.8% |
| 2.5 | 0.5% | 1.0% | 1.3% | 1.3% | 1.4% | 1.3% | 1.3% | 1.3% | 1.2% | 1.2% | 1.1% | 1.0% | 1.0% | 0.9% | 0.9% | 0.8% |
| 3 | 0.4% | 0.7% | 0.9% | 1.1% | 1.2% | 1.2% | 1.2% | 1.2% | 1.1% | 1.1% | 1.0% | 1.0% | 0.9% | 0.9% | 0.8% | 0.8% |
| 3.5 | 0.3% | 0.5% | 0.7% | 0.9% | 1.0% | 1.0% | 1.0% | 1.0% | 1.0% | 1.0% | 0.9% | 0.9% | 0.8% | 0.8% | 0.8% | 0.7% |
| 4 | 0.2% | 0.4% | 0.5% | 0.7% | 0.8% | 0.8% | 0.9% | 0.9% | 0.9% | 0.9% | 0.8% | 0.8% | 0.8% | 0.8% | 0.7% | 0.7% |
| 4.5 | 0.2% | 0.4% | 0.4% | 0.5% | 0.6% | 0.7% | 0.7% | 0.8% | 0.8% | 0.8% | 0.8% | 0.7% | 0.7% | 0.7% | 0.7% | 0.7% |
| 5 | 0.2% | 0.3% | 0.4% | 0.4% | 0.5% | 0.6% | 0.6% | 0.7% | 0.7% | 0.7% | 0.7% | 0.7% | 0.7% | 0.6% | 0.6% | 0.6% |
| 5.5 | 0.1% | 0.3% | 0.4% | 0.4% | 0.4% | 0.5% | 0.6% | 0.6% | 0.6% | 0.6% | 0.6% | 0.6% | 0.6% | 0.6% | 0.6% | 0.6% |
| 6 | 0.1% | 0.2% | 0.3% | 0.4% | 0.4% | 0.4% | 0.5% | 0.5% | 0.5% | 0.5% | 0.6% | 0.6% | 0.6% | 0.6% | 0.5% | 0.5% |
| 6.5 | 0.1% | 0.2% | 0.3% | 0.3% | 0.4% | 0.4% | 0.4% | 0.4% | 0.5% | 0.5% | 0.5% | 0.5% | 0.5% | 0.5% | 0.5% | 0.5% |
| 7 | 0.1% | 0.2% | 0.2% | 0.3% | 0.4% | 0.4% | 0.4% | 0.4% | 0.4% | 0.4% | 0.4% | 0.5% | 0.5% | 0.5% | 0.5% | 0.5% |
| 7.5 | 0.1% | 0.1% | 0.2% | 0.3% | 0.3% | 0.4% | 0.4% | 0.4% | 0.4% | 0.4% | 0.4% | 0.4% | 0.4% | 0.4% | 0.4% | 0.4% |
| 8 | 0.1% | 0.1% | 0.2% | 0.2% | 0.3% | 0.3% | 0.4% | 0.4% | 0.4% | 0.4% | 0.4% | 0.4% | 0.4% | 0.4% | 0.4% | 0.4% |

WIDTH FROM CAMERA ($X_{ROOM}$)

PERCENTAGE OF FRAME OCCUPIED BY HEAD 151

DEPTH FROM CAMERA ($Y_{ROOM}$)

| WIDTH FROM CAMERA ($X_{ROOM}$) | 0.5 | 1 | 1.5 | 2 | 2.5 | 3 | 3.5 | 4 | 4.5 | 5 | 5.5 | 6 | 6.5 | 7 | 7.5 | 8 |
|---|---|---|---|---|---|---|---|---|---|---|---|---|---|---|---|---|
| 0 | 541 | 273 | 180 | 138 | 111 | 92 | 81 | 69 | 61 | 54 | so | 46 | 42 | 38 | 38 | 35 |
| 0.5 | 253 | 211 | 161 | 127 | 104 | 88 | 77 | 69 | 58 | 54 | so | 46 | 42 | 38 | 38 | 35 |
| 1 | 104 | 131 | 123 | 108 | 92 | 81 | 73 | 65 | 58 | so | so | 46 | 42 | 38 | 35 | 35 |
| 1.5 | so | 81 | 88 | 84 | 81 | 73 | 65 | 58 | 54 | so | 46 | 42 | 42 | 38 | 35 | 35 |
| 2 | 31 | so | 65 | 69 | 65 | 61 | 58 | 54 | so | so | 46 | 42 | 38 | 35 | 35 | 31 |
| 2.5 | 19 | 38 | so | so | 54 | so | so | so | 46 | 46 | 42 | 38 | 38 | 35 | 35 | 31 |
| 3 | 15 | 27 | 35 | 42 | 46 | 46 | 46 | 46 | 42 | 42 | 38 | 38 | 35 | 35 | 31 | 31 |
| 3.5 | 12 | 19 | 27 | 35 | 38 | 38 | 38 | 38 | 38 | 38 | 35 | 35 | 31 | 31 | 31 | 27 |
| 4 | 8 | 15 | 19 | 27 | 31 | 31 | 35 | 35 | 35 | 35 | 31 | 31 | 31 | 31 | 27 | 27 |
| 4.5 | 8 | 15 | 15 | 19 | 23 | 27 | 27 | 31 | 31 | 31 | 31 | 27 | 27 | 27 | 27 | 27 |
| 5 | 8 | 12 | 15 | 15 | 19 | 23 | 23 | 27 | 27 | 27 | 27 | 27 | 27 | 23 | 23 | 23 |
| 5.5 | 4 | 12 | 15 | 15 | 15 | 19 | 23 | 23 | 23 | 23 | 23 | 23 | 23 | 23 | 23 | 23 |
| 6 | 4 | 8 | 12 | 15 | 15 | 15 | 19 | 19 | 19 | 19 | 23 | 23 | 23 | 23 | 19 | 19 |
| 6.5 | 4 | 8 | 12 | 12 | 15 | 15 | 15 | 15 | 19 | 19 | 19 | 19 | 19 | 19 | 19 | 19 |
| 7 | 4 | 8 | 8 | 12 | 15 | 15 | 15 | 15 | 15 | 15 | 15 | 19 | 19 | 19 | 19 | 19 |
| 7.5 | 4 | 4 | 8 | 12 | 12 | 15 | 15 | 15 | 15 | 15 | 15 | 15 | 15 | 15 | 15 | 15 |
| 8 | 4 | 4 | 8 | 8 | 12 | 12 | 15 | 15 | 15 | 15 | 15 | 15 | 15 | 15 | 15 | 15 |

NUMBER OF PIXELS FOR HORIZONTAL HEAD WIDTH 161

FIG. 16

ESTIMATION OF HUMAN LOCATIONS IN TWO-DIMENSIONAL COORDINATES USING MACHINE LEARNING

BACKGROUND

Technical Field

This disclosure is directed in general to videoconferencing. In one aspect, the disclosure relates to techniques for accurately estimating the location of human heads for participants in a video conference.

Description of the Related Art

During a videoconference, people at a videoconferencing endpoint interact with people at one or more other videoconferencing endpoints. When there are multiple meeting participants in a video conference room, the framing of specific groups or individuals in the video conference room can be improved by determining the location of individual participants in the room. For example, by detecting the location of meeting participants in a room location (e.g., the distance and direction between the camera and meeting participant), advanced framing and tracking applications can help frame a group (detect all the people in the conference room and frame them), frame active speakers (detect the active speakers and focus them for the far sight viewing), track presenters (detect active speakers and continuously track them), and frame people individually (detect each individual person the conference room and make a composite stream by assigning each in their own frame). Existing location detection solutions typically require a dedicated depth estimation or distance detection sensor hardware, such as stereo vision camera, Lidar, Radar, or any other time-of-flight-based sensor that in addition to providing the visual scan of the scene also provides the depth of each pixel. In addition to the additional hardware costs, such solutions require additional software to process the data, thereby increasing the overall cost and complexity of the system. Other location detection solutions may use machine learning-based monocular depth estimation models, but such solutions have significant limitations in terms of high latency required for processing the information on a frame-by-frame basis or the consumption of significant computational resources required to reduce the latency. Moreover, machine learning-based monocular depth estimation models do not have the required accuracy for applications such as used with larger conference rooms where they provide coarse depth estimations. As seen from the foregoing, existing video conferencing room systems suffer from a number of design drawbacks and performance deficiencies in terms of providing an accurate, efficient, and cost effective location detection function without imposing significant hardware and processing costs.

SUMMARY

A method, apparatus, system, and computer program product are provided for accurately determining the location of meeting participants in a video conference meeting room in a two-dimensional coordinate plane by using machine learning techniques to identify, for each detected human head, a head bounding box with specified image plane coordinate and dimension information for an image plane, and then performing a reverse table look-up operation to extract two-dimensional room distance parameters specifying the location for each meeting participant in the two-dimensional coordinate plane. In operation, a camera in the video conference meeting room may be provided with a human head detector machine learning model which is trained to detect or classify human heads from input camera video frame or image data, and to identify, for each detected human head, a head bounding box with specified image plane coordinate and dimension information in a head box data structure $\{x_{box}, y_{box}, \text{width}, \text{height}\}$. In addition, each camera may be configured to process each identified head bounding box by using a reverse look-up table or a set of mathematical operations outlined in this disclosure to perform a geometrical transformation for determining the meeting room coordinates $\{x_{ROOM}, y_{ROOM}\}$ of each detected head from the camera focal point, where $x_{ROOM}$ represents a horizontal or pan room distance from a center line of sight of camera focal point, and where $y_{ROOM}$ represents a vertical or depth room distance from the camera. To this end, the head box data structure $\{x_{box}, y_{box}, \text{width}, \text{height}\}$ may be provided as an input to a distance estimation algorithm that takes head box {width, height} parameters to pick the best matching distance values for the two-dimensional room distance parameters $\{x_{ROOM}, y_{ROOM}\}$ from the reverse look-up table by first using one of the parameters (e.g., width or height), and then using the other parameter as a tie breaking if multiple $\{x_{ROOM}, y_{ROOM}\}$ coordinates are determined by the one. In other embodiments, the two-dimensional room distance parameters $\{x_{ROOM}, y_{ROOM}\}$ can also be estimated using a set of mathematical operations utilizing the camera's vertical and horizontal field of view in degrees and resolution in pixels. In selected embodiments, the head box data structure may then be modified to embed the distance information for each head (e.g., $\{x_{box}, y_{box}, \text{width}, \text{height}, x_{ROOM}, y_{ROOM}\}$).

BRIEF DESCRIPTION OF THE DRAWINGS

The present disclosure may be understood, and its numerous objects, features and advantages obtained, when the following detailed description of a preferred embodiment is considered in conjunction with the following drawings.

FIG. 3 depicts a table of pan angle values for a video conference camera corresponding to different coordinate positions in an example conference room.

FIG. 10 depicts a table of angular extent angles for a vertical head dimension corresponding to different coordinate positions in an example conference room in accordance with selected embodiments of the present disclosure.

FIG. 11 depicts a table of values indicating the percentage of the frame occupied by the head in a vertical head dimension corresponding to different coordinate positions in an example conference room in accordance with selected embodiments of the present disclosure.

FIG. 14 depicts a table of angular extent angles for a horizontal head dimension corresponding to different coordinate positions in an example conference room in accordance with selected embodiments of the present disclosure.

FIG. 15 depicts a table of values indicating the percentage of the frame occupied by the head in a horizontal head dimension corresponding to different coordinate positions in an example conference room in accordance with selected embodiments of the present disclosure.

FIG. 16 depicts a table of values indicating the number of pixels for a horizontal width of a head frame corresponding to different coordinate positions in an example conference room in accordance with selected embodiments of the present disclosure.

DETAILED DESCRIPTION

Figure 1:
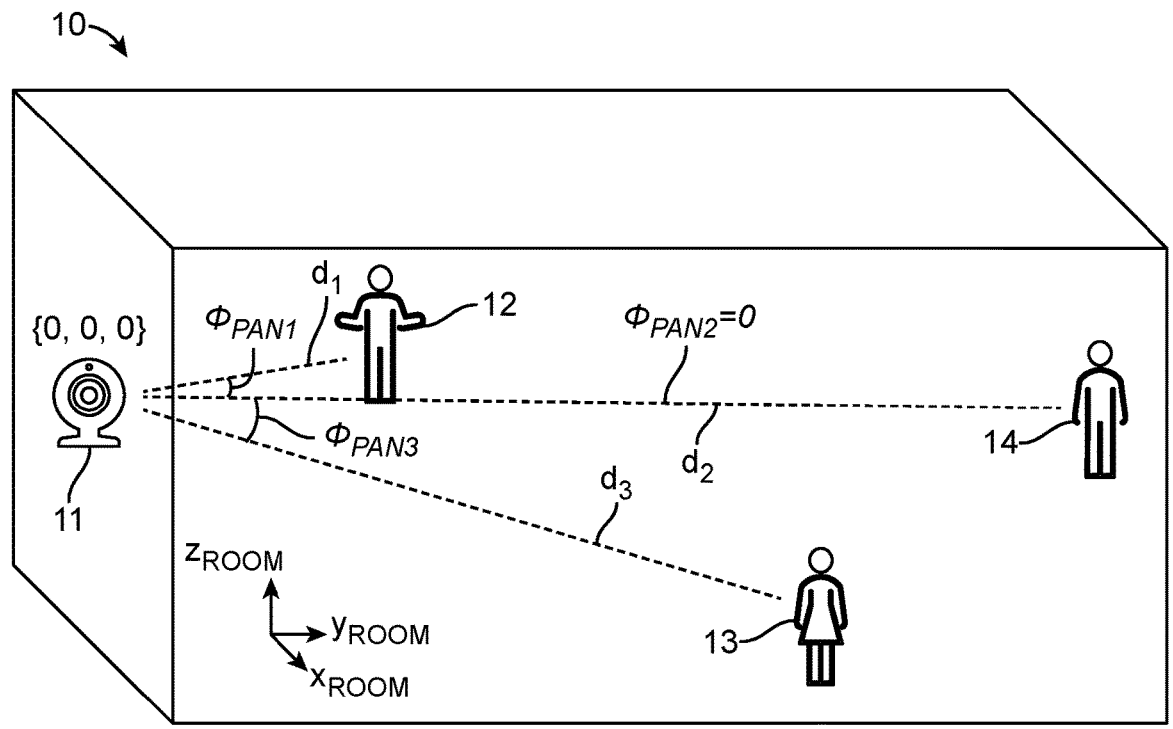
FIG. 1 is a perspective view of a conference room with three people located at different coordinate positions in relation to a video conference camera.

A system, apparatus, methodology, and computer program product are described for correctly estimating human locations in two-dimensional room coordinates using machine learning to detect one or more conference participants within a frame of image data, to identify and frame interest regions for conference participants with head bounding boxes, and to perform a reverse table look-up operation to extract two-dimensional room distance parameters specifying the location for each meeting participant in the two-dimensional room coordinate plane.

Various illustrative embodiments of the present invention will now be described in detail with reference to the accompanying figures. In the drawings and the description of the drawings herein, certain terminology is used for convenience only and is not to be taken as limiting the examples of the present disclosure. In the drawings and the description below, like numerals indicate like elements throughout. Throughout this disclosure, terms are used in a manner consistent with their use by those of skill in the art. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts without including every element or detail to avoid limiting or obscuring the present invention. Such descriptions and representations are used by those skilled in the art to describe and convey the substance of their work to others skilled in the art. It is also noted that, throughout this detailed description, certain elements in the figures are illustrated for simplicity and clarity and have not necessarily been drawn to illustrate specific details. Furthermore, the described features, advantages, and characteristics of the invention may be combined in any suitable manner in one or more embodiments. One skilled in the relevant art will recognize, considering the description herein, that the embodiments can be practiced without one or more of the specific features or advantages of a particular embodiment. In other instances, additional features and advantages may be recognized in certain embodiments that may not be present in all embodiments. For example, selected aspects are depicted with reference to simplified diagrammatic depictions and block drawings without including every detail to avoid limiting or obscuring the present invention. Such details are well known and not considered necessary to teach one skilled in the art of how to make or use the present invention.

By way of background information, video conferencing systems typically connect people at a videoconferencing endpoint, such as a video conference room, with people at one or more other videoconferencing endpoints. In such systems, the framing of specific groups or individuals in the video conference room can be improved by determining the location of individual participants in the room. For example, if Person A is sitting at 2.5 meters from the camera and Person B is sitting at 4 meters from the camera, the ability to detect this location information can enable various advanced framing and tracking experiences. For example, participant location information can be used to design a framing or bounding box that excludes people located more than X meters from the camera from framing and tracking. In addition, sound processing can be applied to amplify the speech of a speaker who is located more than X meters from the camera. In addition, a two-dimensional acoustic fence can be designed that is active not only on the horizontal FOV, but also in the depth axis from the camera (e.g., that is perpendicular of camera horizontal FOV). In addition, focus zones in large conference rooms can be defined to create framing around people sitting in the zone, and to exclude those not in the zone from framing. In addition, sound processing can be applied to automatically mute the system if meeting participants are located more than X meters from the camera and to unmute the system when any one of the participants comes within the predefined distance from the camera.

Instead of relying on expensive sensor hardware to detect the distance or location for meeting room participants, there is disclosed herein a sensor-less scheme for determining distance measurement or location of a person in a video conference room which uses a head detection machine learning model, camera optics information, and geometrical transformations to determine two-dimensional room distance parameters $\{x_{ROOM}, y_{ROOM}\}$ which specify the location for each meeting participant in the two-dimensional coordinate plane. To illustrate an example video conference room arrangement, reference is now made to FIG. 1 which illustrates a perspective view 10 of a conference room with a video conference camera 11 and three people 12-14 located at different coordinate positions in relation to the video conference camera 11. In this arrangement, the camera 11 has a field of view (FOV) from a left side of the room which is denoted with the 3-dimensional coordinates {0, 0, 0}. In addition, reference is made to FIG. 2 which is a simplified plan view 20 of the conference room shown in FIG. 1, but with the location of the people 22-24 indicated with 2D coordinates in relation to the camera location. In this arrangement, FIG. 1 shows that the camera 11 captures a view of all three participants 12-14 having locations that can be characterized in terms of a pan angle $\phi_{PAN}$ and a distance measure between the camera 11 and each participant 12, 14. In particular, the first participant 12 has a location defined by pan angle $\phi_{PAN}$ and a first distance measure $d_1$. In addition, the second participant 14 has a location defined by pan angle $\phi_{PAN2}$ and a second distance measure $d_2$, and the third participant 13 has a location defined by pan angle $\phi_{PAN3}$ and a third distance measure $d_3$.

Figure 2:
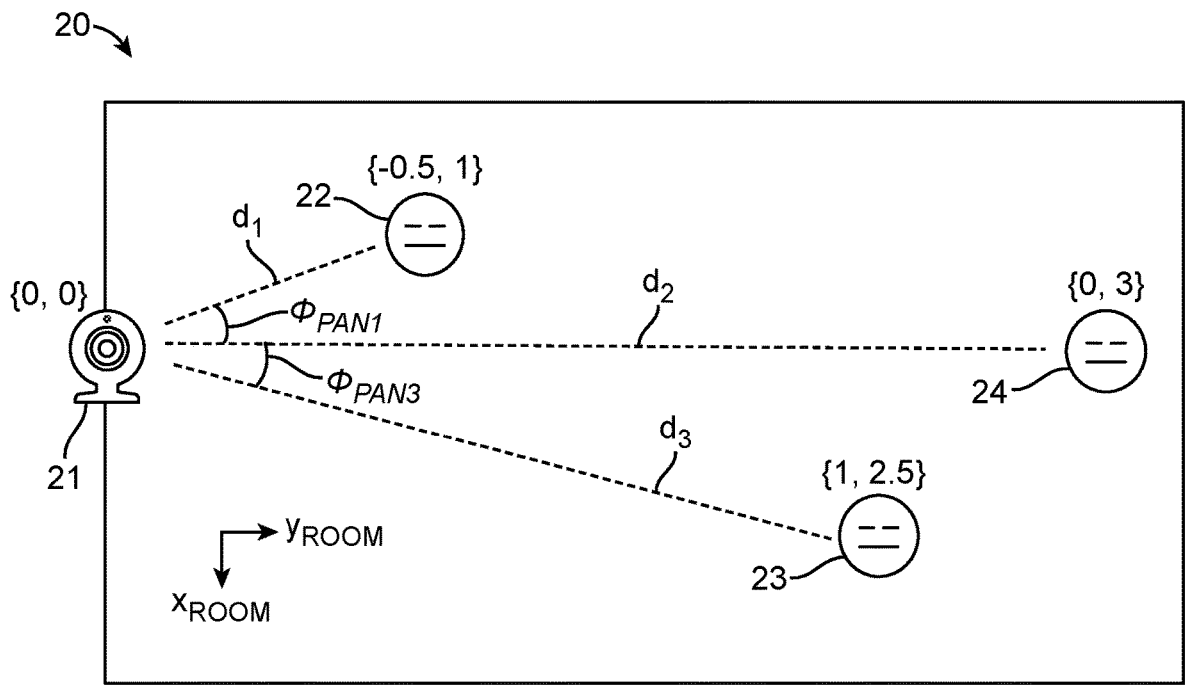
FIG. 2 is a simplified plan view of the conference room shown in FIG. 1.

Turning now to FIG. 2, there is shown a plan view of the conference room shown in FIG. 1 where the arrangement of the camera 21 and participants 22-24 correspond to the camera 11 and people 12-14. As depicted, the location of each participant 22-24 may be characterized in terms of a pan angle $\phi_{PAN}$ and a distance measure di that is derived from an $X_{ROOM}$ dimension and $Y_{ROOM}$ dimension. In particular, the first participant 22 has a location defined by pan angle $\phi_{PAN1}$ and a first distance measure $d_1$ which is characterized by two-dimensional room distance parameters {−0.5, 1} to indicate that the participant 22 is located at a vertical distance of 1 meter (measured along the $y_{ROOM}$ axis) and at a horizontal distance of −0.5 meters (measured along the $x_{ROOM}$ axis). In addition, the second participant 24 has a location defined by pan angle $\phi_{PAN2}$ and a second distance measure $d_2$ which is characterized by two-dimensional room distance parameters {0, 3} to indicate that the participant 24 is located at a vertical distance of 3 meters (measured along the $y_{ROOM}$ axis) and at a horizontal distance of 0 meters (measured along the $x_{ROOM}$ axis) to indicate that the second person is located straight in the line of sight of the camera or straight from the focal point of the camera. Finally, the third participant 23 has a location defined by pan angle $\phi_{PAN3}$ and a third distance measure $d_3$ which is characterized by two-dimensional room distance parameters {1, 2.5} to indicate that the participant 23 is located at a vertical distance of 2.5 meters (measured along the $y_{ROOM}$ axis) and at a horizontal distance of 1 meter (measured along the $x_{ROOM}$ axis).

To demonstrate the relationship between the pan angle values ($\phi_{PAN}$) and the two-dimensional room distance parameters $\{x_{ROOM}, y_{ROOM}\}$, reference is now made to FIG. 3 which depicts a table 30 in which pan angle values ($\phi_{PAN}$) 31 for a video conference camera are computed for meeting participants located at different coordinate positions $\{x_{ROOM}, y_{ROOM}\}$ in an example conference room. As will be appreciated, an identical table of negative pan angle values ($-\phi_{PAN}$) would be computed for coordinate positions $\{-x_{ROOM}, y_{ROOM}\}$ in the example conference room. As depicted, the same pan angle value ($\phi_{PAN}=0$) will be generated for a meeting participant located along the center line of sight of camera (e.g., $x_{ROOM}=0$) at any depth measure (e.g., $y_{ROOM}=0.5$-$8$). Similarly, the same pan angle value ($\phi_{PAN}=45$) will be generated for a meeting participant located at any coordinate position where $x_{ROOM}=y_{ROOM}$. As can be seen, the pan angle $\phi_{PAN}$ alone is not sufficient information for determining the two-dimensional room distance parameters $\{x_{ROOM}, y_{ROOM}\}$ for the location of a meeting participant.

Figure 4:
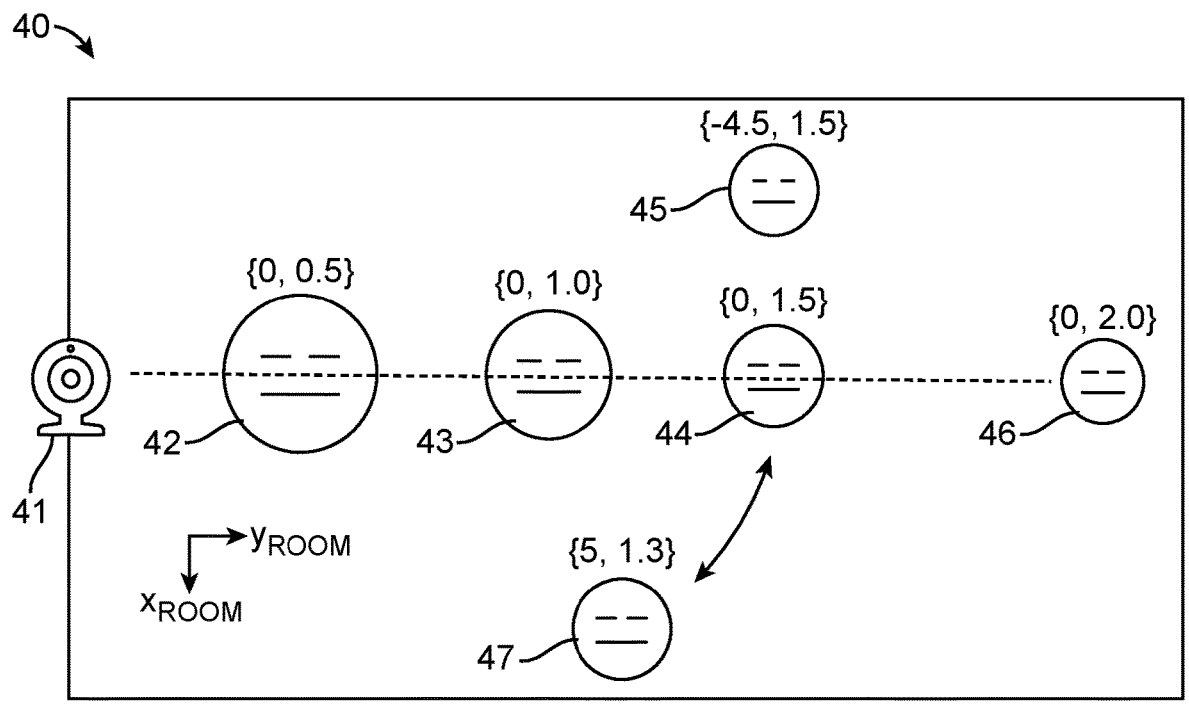
FIG. 4 is a simplified plan view illustration of how the perspective projection on the camera image sensor changes to make an object appear smaller to the vision system as the object moves further from the camera.

This effect is illustrated in FIG. 4 which depicts a simplified plan view 40 of a conference room with a video conference camera 41 with a meeting participant in different locations to illustrate how the perspective projection on the camera image sensor changes to make an object appear smaller to the vision system as the object moves further from the camera. In particular, any geometrical shape or object that is located straight in front of the camera 41 when looked straight, in the front view at 90-degree viewing angle, gives straight horizontal and vertical edges. But as the object moves further away from the camera 41 in the same perspective or viewing angle, it appears to be smaller to the vision system camera 41. For example, a meeting participant 42 located on the center line of sight of camera focal point (e.g., ($\phi_{PAN}=0$) at a distance of d=0.5 meters will appear larger to the camera 41 than a meeting participant 43 located on the center line of sight of camera focal point (e.g., ($\phi_{PAN}=0$) at a larger distance of d=1.0 meters due to vanishing points perspective. Similarly, the meeting participants 44, 45 located on the center line of sight of camera focal point at larger distances (e.g., d=1.50 meters and d=1.50 meters) will appear smaller and smaller. Thus, as a meeting participant moves further away from the camera 41, the height and width of the participant become smaller to the vision system, and when projected to camera image sensor, they are represented with a smaller number of pixels compared to the ones that are near to the camera.

In addition, it will be appreciated that any meeting participant who is not standing right in the line of sight of camera (e.g., ($\phi_{PAN}=0$) will create perspective projection on the camera image sensor. For example, the meeting participant 45 who is not located on the center line of sight of camera (e.g., pan angle Ø≠0) will appear smaller than the participant 44 that is located at the same vertical distance as the meeting participant 44 measured along the yROOM axis. Likewise, the meeting participant 47 who is not located on the center line of sight of camera (e.g., pan angle Ø≠0) may appear to have the same size as the meeting participant 44, even though they are located at different vertical distances as measured along the yROOM axis. As a result, if two heads are seen by the camera has having the same size, they are not necessarily located at the same distance, and their locations in a 2D $x_{ROOM}$-$y_{ROOM}$ plane may be different due to the camera pan angle and distortion in the height and width.

Figure 5:
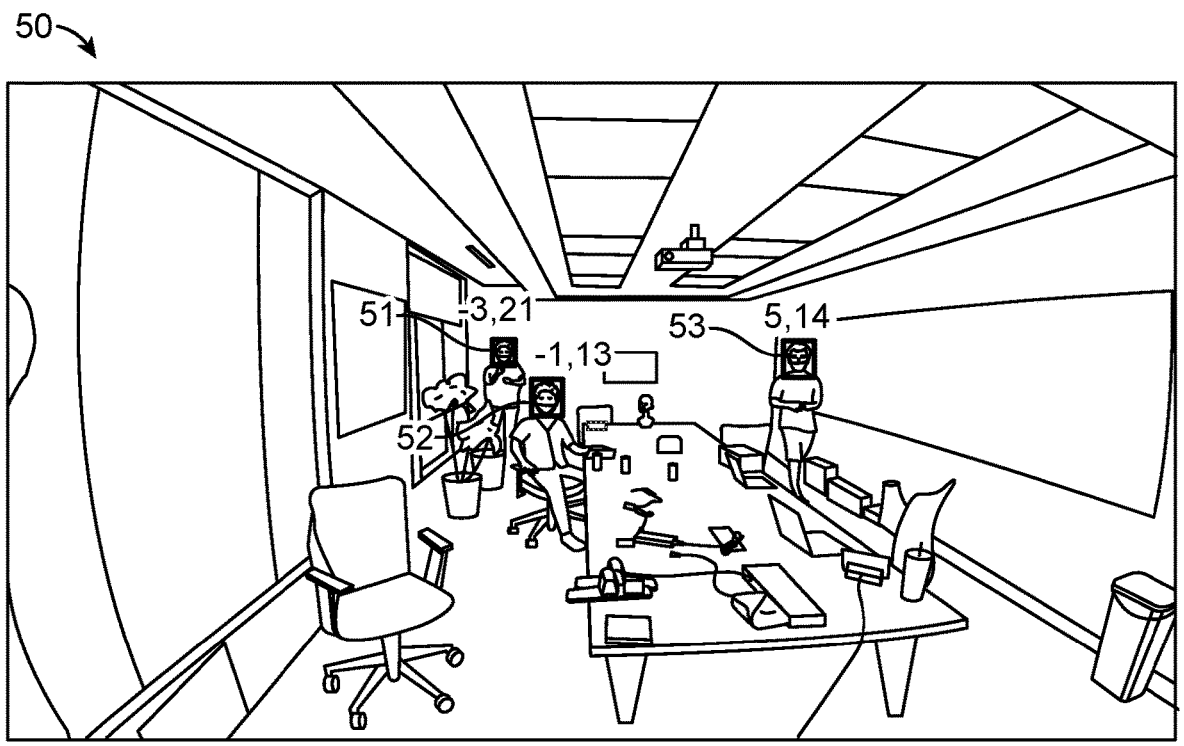
FIG. 5 is a picture image of a conference room with three persons located at different coordinate positions and with corresponding head frames identified in terms of the coordinate positions for each person.

To illustrate a real-world example of the challenges posed by perspective projection effects when determining the locations of meeting participants, reference is now made to FIG. 5 which depicts a picture image 50 of a conference room with three persons located at different coordinate positions and with corresponding head frames 51-53 identified in terms of the coordinate positions for each person. As depicted, the coordinate positions may be measured with reference to a room width dimension $x_{ROOM}$ and a room depth dimension $y_{ROOM}$. The room width dimension $x_{ROOM}$ extends across the width of the room from a center line of sight of camera focal point so that negative values of $x_{ROOM}$ are located to the left of the center line and positive values of $x_{ROOM}$ are located to the right of the center line. In addition, the room depth dimension $y_{ROOM}$ extends down the length of the room across the center line of sight of camera focal point. By applying computer vision processing to the picture image 50, a first meeting participant is detected in the back left corner of the room, and an interest region around the head of the first meeting participant is framed with a first head bounding box 51, where the first meeting participant is located at the two-dimensional room distance parameters $\{x_{ROOM}=-3, y_{ROOM}=21\}$. In similar fashion, a second meeting participant seated at the table is detected with the head of the second meeting participant framed with a second head bounding box 52, where the second meeting participant is located at the two-dimensional room distance parameters $\{x_{ROOM}=-1, y_{ROOM}=13\}$. Finally, a third meeting participant standing to the right is detected with the head of the third meeting participant framed with a third head bounding box 53, where the third meeting participant is located at the two-dimensional room distance parameters $\{x_{ROOM}=5, y_{ROOM}=14\}$.

For many real-world applications, it is important to know the exact horizontal and vertical location of the humans in the room to create more comprehensive and complete understanding of the indoor conference room environments. The ability to determine two-dimensional room distance parameters for each meeting participant can be enabled by using a depth estimation/detection sensor or computationally intensive machine learning-based monocular depth estimation models, but such approaches impose significant hardware and/or processing costs without providing the required accuracy for measuring participant locations.

With this understanding of the relationship between image projection size at the camera and distance to an object, there is disclosed herein a method, apparatus, system, and computer program product for accurately determining the location of meeting participants by using a known measure of the typical human head height and width and a reverse look-up table operation to transform head height and width measurements in a viewing plane into two-dimensional room distance parameters. In particular, the statistical distribution of human head height and width measurements may be used to determine a min-median-max measure for the head size in centimeters. And by knowing the camera field of view resolution in both horizontal and vertical directions with the respective horizontal and vertical pixel counts, the measured angular extent of each head can be used to compute the percentage of the overall frame occupied by the head and the number of pixels for the head height and width measures. Using this information to compute a look-up table for min-median-max head sizes (height and width) at various distances, an artificial intelligence (AI) human head detector model can be applied to detect the location of each head in a 2D viewing plane with specified image plane coordinates and associated width and height measures for a head bounding box (e.g., $\{x_{box}, y_{box}, \text{width}, \text{height}\}$). By using the reverse look-up table operation, the distance can be determined between the camera and each head that is located on the center line of sight of camera focal point.

Figure 6:
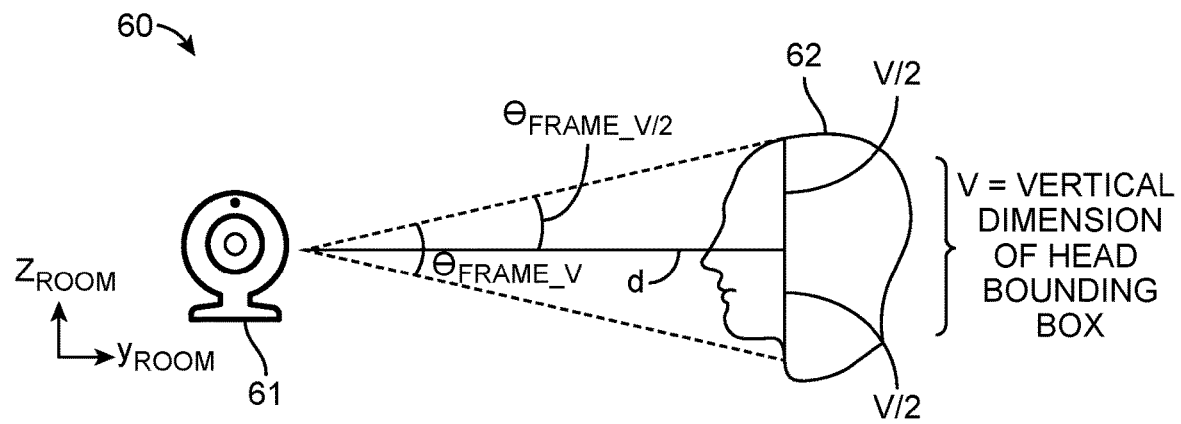
FIG. 6 is a simplified side view illustrating a vertical head height measure that can be calculated based on an angular extent of the upper half of the vertical head height and the distance between the camera and head.

To provide additional details for an improved understanding of selected embodiments of the present disclosure, reference is now made to FIG. 6 which depicts a simplified side view 60 of a camera 61 that is positioned to capture an image of a human head 62 so that a vertical head height measure V that can be calculated based on an angular extent angle $\theta_{FRAME\_V/2}$ of the upper half of the vertical head height V/2 and the distance d between the camera 61 and head 62. As depicted, the human head 62 has a head height V which corresponds to the vertical dimension of a head bounding box. From the vantage of the camera 61, the vertical head height V makes an angle $\theta_{FRAME\_V}$ extending from the bottom to the top of the head 62. Upon bisecting the angle $\theta_{FRAME\_V}$, the upper half of the vertical head height V/2 makes an angle $\theta_{FRAME\_V/2}$ with the camera's focal point (or the line of sight that is straight at 90-degrees from the camera focal point). As a result, the vertical head height measure V can be calculated based on an angular extent $\theta_{FRAME\_V/2}$ and the distance d between the camera 61 and head 62 using the equation $\tan(\theta_{FRAME\_V/2})=(V/2)/d$. Solving for V, the vertical head height measure V may be computed as $V=2d\times\tan(\theta_{FRAME\_V/2})$.

Figure 7:
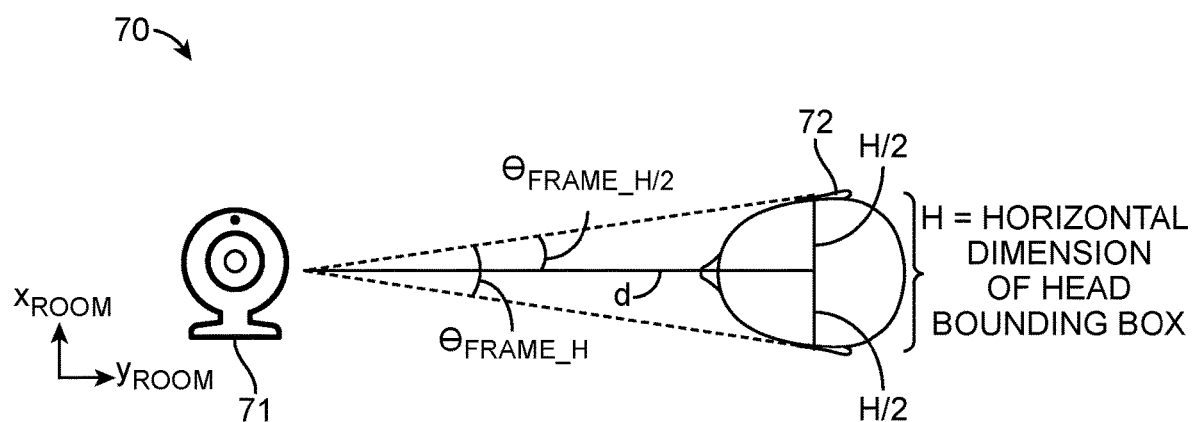
FIG. 7 is a simplified plan view illustrating a horizontal head width measure that can be calculated based on an angular extent of half of the horizontal head width and the distance between the camera and head.

To provide additional details for an improved understanding of selected embodiments of the present disclosure, reference is now made to FIG. 7 which depicts a simplified top or plan view 70 of a camera 71 that is positioned to capture an image of a human head 72 so that a horizontal head width measure H that can be calculated based on an angular extent angle $\theta_{FRAME\_H/2}$ of one half of the horizontal head width H/2 and the distance d between the camera 71 and head 72. As depicted, the human head 72 has a head width H which corresponds to the horizontal dimension of a head bounding box. From the vantage of the camera 71, the horizontal head width H makes an angle $\theta_{FRAME\_H}$ extending from the sides of the head 72. Upon bisecting the angle $\theta_{FRAME\_H}$, the upper half of the horizontal head width H/2 makes an angle $\theta_{FRAME\_H/2}$ with the camera's focal point (or the line of sight that is straight at 90-degrees from the camera focal point). As a result, the horizontal head width measure H can be calculated based on an angular extent $\theta_{FRAME\_H/2}$ and the distance d between the camera 71 and head 72 using the equation $\tan(\theta_{FRAME\_H/2})=(H/2)/d$. Solving for H, the horizontal head width measure H may be computed as $H=2d\times\tan(_{FRAME\_H/2})$.

Figure 8:
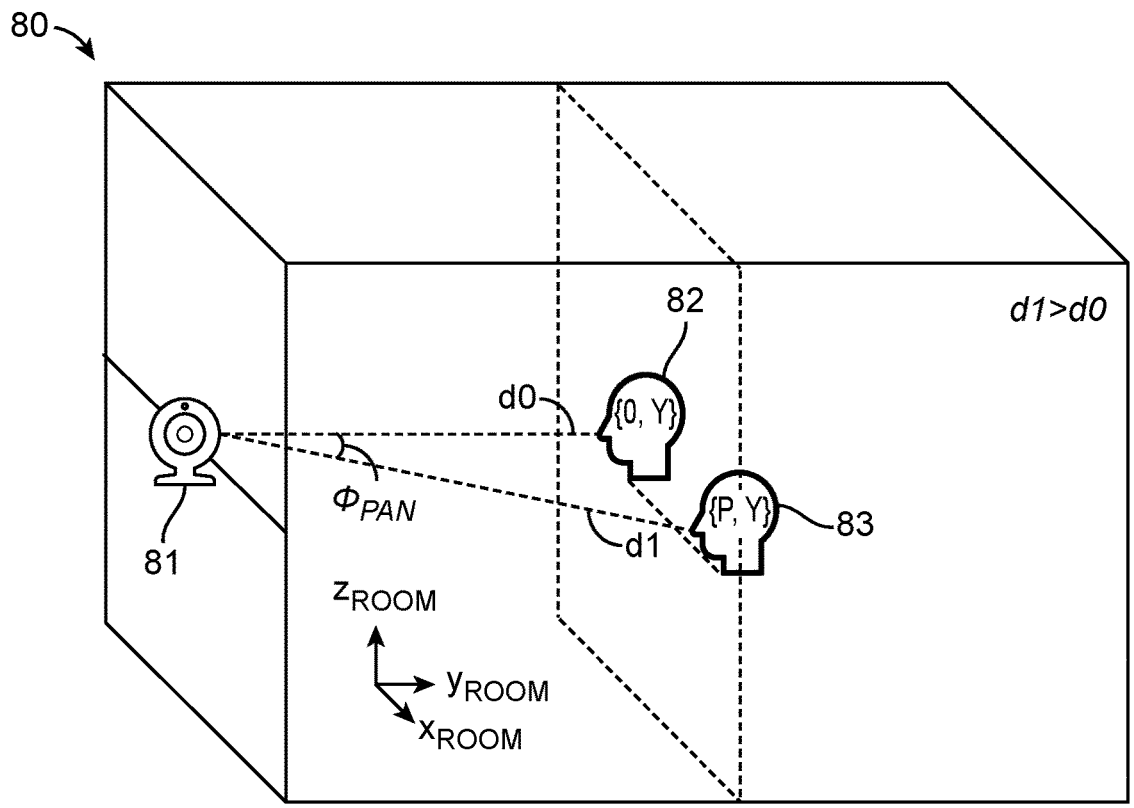
FIGS. 8-9 are perspective view illustrations of how a human head that pans laterally in a room appears to have a smaller vertical height dimension because of perspective projection.
Figure 9:
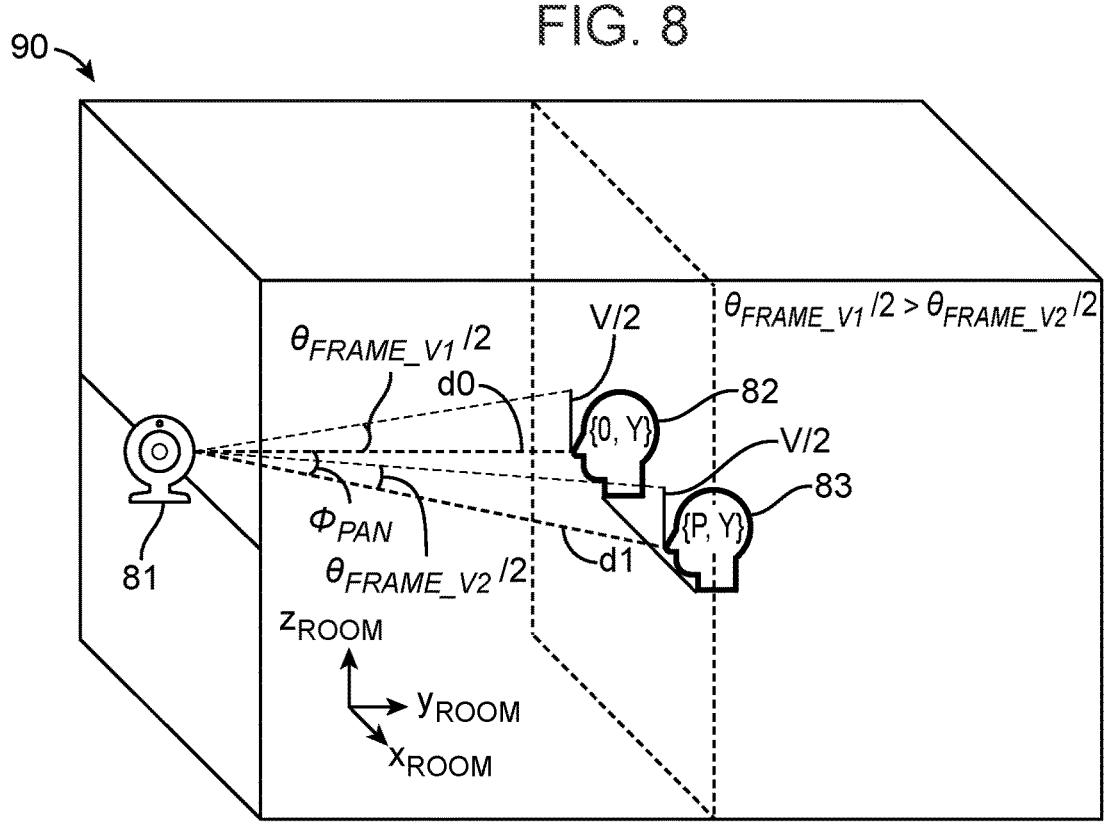

As the human head is moved laterally or sideways from the center line of sight of camera focal point at a pan angle $\emptyset_{PAN}$, the perspective projection will make the head look smaller than its original vertical and horizontal head measures V, H. This is explained with reference to FIGS. 8-9 which provide perspective view illustrations 80, 90 of a human head that pans laterally in a room to show how the human head will appear to have a smaller vertical height dimension because of perspective projection. In FIG. 8, the perspective view 80 of the conference room shows a video conference camera 81 with a meeting participant located in a first, centered position 82 and a second, panned position 83 that is shifted laterally in the $X_{ROOM}$ direction. In the first, centered position, the meeting participant 82 is located on the center line of sight of camera focal point (e.g., $(\phi_{PAN}=0)$ at a distance of $d_0=Y$ meters, so the two-dimensional room distance parameters for the first, centered position 82 are $\{x_{ROOM}=0, y_{ROOM}=Y\}$. In the second, panned position, the meeting participant 83 is shifted laterally in the $X_{ROOM}$ direction by a panned angle $\phi_{PAN}$ and is located at a distance of $d_1 > d_0$ meters, so the two-dimensional room distance parameters for the second, panned position 83 are $\{x_{ROOM}=P, y_{ROOM}=Y\}$. In FIG. 9, the perspective view 90 illustrates how the same vertical head height measure V/2 for the meeting participant locations 82, 83 will result in an angular extent $\theta_{FRAME\_V1}/2$ for the first meeting participant location 82 that is larger than the angular extent $\theta_{FRAME\_V2}/2$ for the second meeting participant location 83. In effect, the fact that the second, panned position 83 is located further away from the camera 81 than the first, centered position 82 ($d_1 > d_0$) results in the angular extent for the second, panned position 83 appearing to be smaller than the angular extent for the first, centered position 82 so that $\theta_{FRAME\_V1}/2 > \theta_{FRAME\_V2}/2$.

From the foregoing, the problem is to find an angular extent for the entire head height $\theta_{HH}$ and then represent it as a percentage of the full frame vertical field of view (VFrame_Percentage) which is then translated into the number of pixels the head will occupy (VHead_Pixel_Count) at a particular distance and at a pan angle $\emptyset_{PAN}$. To this end, the angular extent for the entire head height $\theta_{HH1}$ for the first meeting participant location 82 may be calculated by starting with the equation, $\tan(\theta_{HH1}/2)=(V/2)/d_0$. Solving for the angular extent $\theta_1$, the angular extent for the entire head height $\theta_{HH1}$ may be calculated as $\theta_{HH1}=2\arctan((V/2)/d_0)$. In similar fashion, the angular extent for the entire head height $\theta_{HH2}$ for the second meeting participant location 83 located at the pan angle $\phi_{PAN}$ may be calculated by starting with the equation, $\tan(\theta_{HH2}/2)=(V/2)/d_1$, where $d_1=\sqrt{d_0^2+P^2}$. Solving for the angular extent $\theta_{HH2}$, the angular extent for the entire head height $\theta_{HH2}$ may be calculated as $\theta_{HH2}=2\times\arctan((V/2)/d_1)=2\times\arctan((V/2\sqrt{d_0^2+P^2}))$. Based on this computation, the percentage of the frame occupied by the head height for the second meeting participant location 83 can be computed as VFrame_Percentage=$\theta_{HH2}$/Vertical FOV. In addition, the corresponding number of pixels for the head height for the second meeting participant location 83 can be computed as VHead_Pixel_Count=VFrame_Percentage×Vertical FOV in pixels.

Based on the foregoing calculations, the angular extent for the entire head height $\theta_{HH}=\theta_{FRAME\_V}$ may be calculated at discrete distances of 0.5 meters in each of the $x_{ROOM}$ and $y_{ROOM}$ directions that are equivalent to the various angular pan angles $\phi_{PAN}$ listed in FIG. 3. For example, reference is now made to FIG. 10 which depicts a table 100 of angular extent angle values $\theta_{FRAME\_V}$ 101 for a vertical head dimension corresponding to different coordinate positions in an example conference room. In computing the angular extent angle values $\theta_{FRAME\_V}$ 101, the median head height V=0.225 m. For example, the angular extent angle value $\theta_{FRAME\_V}$ for room position $\{x_{ROOM}=0.5, y_{ROOM}=1.0\}$ is computed from the corresponding pan angle $\phi_{PAN}=63.43$ (taken from the table 30 shown in FIG. 3) as $\theta_{FRAME\_V}=2\times\arctan((V/(2\sqrt{d_0^2+P^2})))=2\times\arctan((0.225/(2\sqrt{0.5^2+1^2})))=11.5$ (rounded up from 11.49).

Based on the foregoing calculations, the percentage of the frame occupied by the head height at a given meeting room location can be computed as VFrame_Percentage=$\theta_2$/Vertical FOV. For example, reference is now made to FIG. 11 which depicts a table 110 of percentage of frame occupied by the human head values VFrame_Percentage 111 for a vertical head dimension corresponding to different coordinate positions in an example conference room. In computing the percentage of frame values VFrame_Percentage 111 from the angular extent angle values $\theta_{FRAME\_V}$ shown in FIG. 10, the camera has a Vertical FOV of 75 degrees. For example, the percentage of frame value VFrame_Percentage for room position $\{x_{ROOM}=0.5, y_{ROOM}=1.0\}$ is computed from the corresponding $\theta_{FRAME\_V}=11.5$ (taken from the table 100 shown in FIG. 10) as VFrame_Percentage=$\theta_{FRAME\_V}$/Vertical FOV=11.5/75=15.3%.

Based on the foregoing calculations, the number of pixels for the median head height at a given meeting room can be computed as VHead_Pixel_Count=VFrame_Percentage×Vertical FOV in pixels. For example, reference is now made to FIG. 12 which depicts a table 120 of values indicating the number of pixels for a vertical height of a head frame corresponding to different coordinate positions in an example conference room. In computing the head pixel count values VHead_Pixel_Count 121 from the frame percentage values VFrame_Percentage shown in FIG. 11, the camera has a Vertical resolution of 2160 pixels. For example, the percentage of frame value VHead_Pixel_Count for room position $\{x_{ROOM}=0.5, y_{ROOM}=1.0\}$ is computed from the corresponding VFrame_Percentage=15.3% (taken from the table 110 shown in FIG. 11) as VHead_Pixel_Count=VFrame_Percentage×Vertical FOV=0.153×2160=330.

Figures 12, 13:
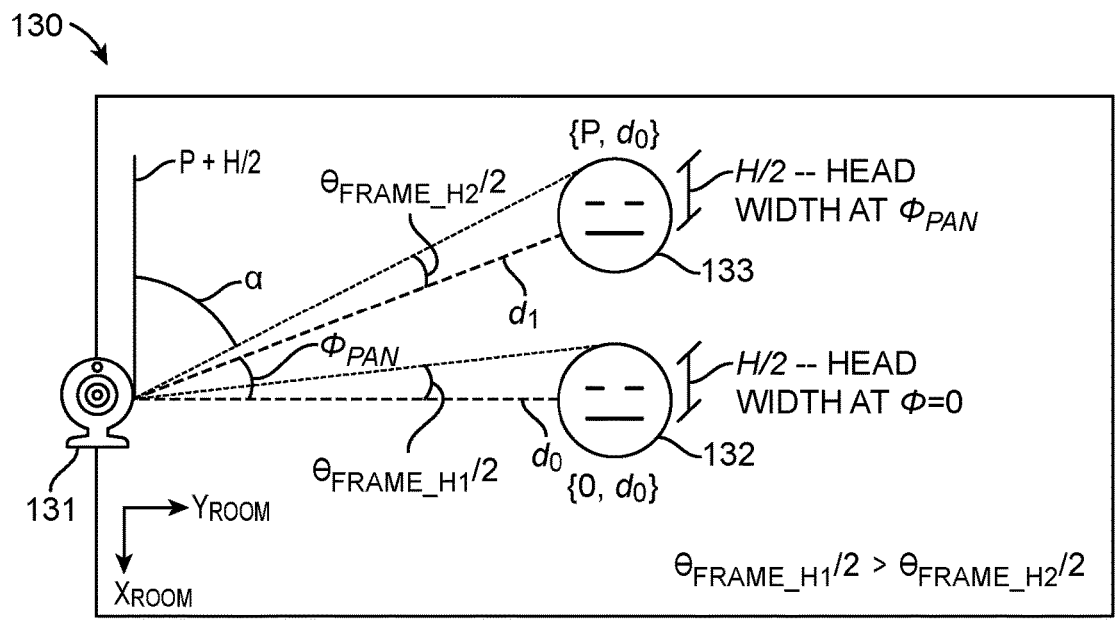
FIG. 12 depicts a table of values indicating the number of pixels for a vertical height of a head frame corresponding to different coordinate positions in an example conference room.
FIG. 13 is a simplified plan view illustrating how a human head that pans laterally in a room appears to have a smaller horizontal width dimension because of perspective projection.

Similar to the perspective projection effects on head height measurements, lateral or panning movement of the human head at a pan angle $\emptyset_{PAN}$ also makes the head smaller with the horizontal head width measurements H. This is explained with reference to FIG. 13 which provides a simplified plan view illustration 130 of a human head that pans laterally in a room to show how the human head will appear to have a smaller horizontal width dimension due to the effects of perspective projection. In FIG. 13, the perspective view 130 of the conference room shows a video conference camera 131 with a meeting participant located in a first, centered position 132 and a second, panned position 133 that is shifted laterally in the negative $X_{ROOM}$ direction. In the first, centered position, the meeting participant 132 is located on the center line of sight of camera focal point (e.g., ($\phi_{PAN}=0$) at a distance of $d_0$ meters, so the two-dimensional room distance parameters for the first, centered position 132 are $\{x_{ROOM}=0, y_{ROOM}=d_0\}$. In the second, panned position, the meeting participant 133 is shifted laterally in the negative $X_{ROOM}$ direction by a panned angle $\theta_{PAN}$ and is located at a distance of $d_1 > d_0$ meters, so the two-dimensional room distance parameters for the second, panned position 133 are $\{x_{ROOM}=P, y_{ROOM}=d_0\}$. From these two positions 132, 133, the same horizontal head width measure H/2 for the meeting participant locations 132, 133 will result in an angular extent $\theta_{FRAME\_H1}/2$ for the first meeting participant location 132 that is larger than the angular extent $\theta_{FRAME\_H2}/2$ for the second meeting participant location 133. In effect, the fact that the second, panned position 133 is located further away from the camera 131 than the first, centered position 132 ($d_1 > d_0$) results in the angular extent for the second, panned position 133 appearing to be smaller than the angular extent for the first, centered position 132 so that $\theta_{FRAME\_H1}/2 > \theta_{FRAME\_H2}/2$.

From the foregoing, the problem is to find an angular extent for the entire head width $\theta_{HW}$ and then represent it as a percentage of the full frame horizontal field of view (HFrame_Percentage) which is then translated into the number of pixels the head will occupy (HHead_Pixel_Count) at a particular distance and at a pan angle $\emptyset_{PAN}$. To this end, the angular extent for the entire head width $\theta_{HW1}$ for the first meeting participant location 132 may be calculated by starting with the equation, $\tan(\theta_{HW1}/2)=(H/2)/d_0$. Solving for the angular extent $\theta_{HW1}$, the angular extent for the entire head height $\theta_{HW1}$ may be calculated as $\theta_{HW1}=2\arctan((H/2)/d_0)$. Referring to FIG. 13, the angular extent for the entire head height $\theta_{HW2}$ for the second meeting participant location 133 located at the pan angle $\phi_{PAN}$ may be calculated by starting with the equation, $\tan(\alpha)=d_0/(P+H/2)$ and then solving for $\alpha=\arctan(d_0/(P+H/2))$. In addition, the equation $\tan(\phi_{PAN})=P/d_0$ can be solved for $\phi_{PAN}=\arctan(P/d_0)$. As depicted in FIG. 13, the angular extent for half of the head height $\theta_{HW2}/2$ for the second meeting participant location 133 can be calculated as $\theta_{HW2}/2=\theta_{FRAME\_H2/2}=90-(\alpha+\phi_{PAN})$. Solving for the entire head width angular extent $\theta_{HW2}$, the angular extent for the entire head height $\theta_{HW2}$ may be calculated as $\theta_{HW2}=2\times(90-\alpha-\phi_{PAN})$. Based on this computation, the percentage of the frame occupied by the head width for the second meeting participant location 133 can be computed as HFrame_Percentage=$\theta_{HW2}$/Horizontal FOV. In addition, the corresponding number of pixels for the head width for the second meeting participant location 133 can be computed as HHead_Pixel_Count=HFrame_Percentage×Horizontal FOV in pixels.

Based on the foregoing calculations, the angular extent for the entire head width $\theta_{HW}=\theta_{FRAME\_H}$ may be calculated at discrete distances of 0.5 meters in each of the $x_{ROOM}$ and $y_{ROOM}$ directions that are equivalent to the various angular pan angles $\phi_{PAN}$ listed in FIG. 3. For example, reference is now made to FIG. 14 which depicts a table 140 of angular extent angle values $\theta_{FRAME\_H}$ 141 for a horizontal head dimension corresponding to different coordinate positions in an example conference room. In computing the angular extent angle values $\theta_{FRAME\_H}$ 141, the median head width is H=0.139 m. For example, the angular extent angle value $\theta_{FRAME\_H}$ for room position $\{x_{ROOM}=0.5, y_{ROOM}=1.0\}$ is computed from the corresponding pan angle $\phi_{PAN}$=63.43 (taken from the table 30 shown in FIG. 3) as $\theta_{FRAME\_H}=2\times(90-\alpha-\phi_{PAN})=2\times(90-\arctan(d_0/(P+H/2))-63.43)=2\times(90-\arctan(0.5/(1+0.139/2))-63.43)=3.02$ (rounded to 3.0).

Based on the foregoing calculations, the percentage of the frame occupied by the head width at a given meeting room location can be computed as HFrame_Percentage=$\theta_{HW}$/Horizontal FOV. For example, reference is now made to FIG. 15 which depicts a table 150 of percentage of frame occupied by the human head values HFrame_Percentage 151 for a horizontal head dimension corresponding to different coordinate positions in an example conference room. In computing the percentage of frame values HFrame_Percentage 151 from the angular extent angle values $\theta_{FRAME\_H}$ shown in FIG. 14, the camera has a Horizontal FOV of 112 degrees. For example, the percentage of frame value HFrame_Percentage for room position $\{x_{ROOM}=0.5, y_{ROOM}=1.0\}$ is computed from the corresponding $\theta_{FRAME\_H}=3$ (taken from the table 140 shown in FIG. 14) as HFrame_Percentage=$\theta_{FRAME\_H}$/Horizontal FOV=3/112=2.678% (rounded to 2.7%).

Based on the foregoing calculations, the number of pixels for the median head width at a given meeting room can be computed as HHead_Pixel_Count=HFrame_Percentage×Horizontal FOV in pixels. For example, reference is now made to FIG. 16 which depicts a table 160 of values indicating the number of pixels for a horizontal width of a head frame corresponding to different coordinate positions in an example conference room. In computing the head pixel count values HHead_Pixel_Count 161 from the frame percentage values HFrame_Percentage shown in FIG. 15, the camera has a Horizontal resolution of 3840 pixels. For example, the percentage of frame value HHead_Pixel_Count for room position $\{x_{ROOM}=0.5, y_{ROOM}=1.0\}$ is computed from the corresponding HFrame_Percentage=2.7% (taken from the table 150 shown in FIG. 15) as HHead_Pixel_Count=HFrame_Percentage×Horizontal FOV=0.027×3840=103.68 (rounded to 104).

In accordance with the present disclosure, the required lookup tables can be pre-computed and stored for use in performing a reverse lookup operation for determining the position and distance of a meeting participant in a room based on the pixel count for the height and width of each human head. For example, computer vision processing of an input image may apply a human head detector machine learning model to detect a meeting participant head having a head bounding box with a pixel height measure Height=149 pixels and pixel width measure Width=87 pixels. By using the detected pixel height and width measures to perform a reverse lookup table operation on a table listing of the number of pixels for the median head height (e.g., Table 120), a predetermined number of closest rows and columns that are nearest to the pixel height measure Height=149 are located. Based on FIG. 12, the closest table values to Height=149 are $(x_{ROOM}, y_{ROOM})=\{(0, 2.5), (1.5, 2), (2, 1.5)\}$. The next step is to do the tie breaking by looking at the pixel height measure Width=87 pixels. For example, each of the three row, column combinations are iteratively compared to the table listing of the number of pixels for the median head width (e.g., Table 160), to find a number nearest to the pixel height measure Width=87 pixels. Based on the example of FIG. 16, the closest position estimate is $(x_{ROOM}, y_{ROOM})=(2, 1.5)$.

As a preliminary step in the disclosed system, apparatus, methodology, and computer program product, each camera image captured from a conference meeting room scene is processed to extract body or person bounding boxes corresponding to each meeting participant. While any suitable body bounding box extraction process may be used, selected embodiments of the present disclosure may implement a process which starts by detecting head bounding boxes from a camera image, and then processing each head bounding box to extract a corresponding body bounding box, such as by extending the head bounding box by predetermined pixel distances in both vertical and horizontal directions.

Figure 17:
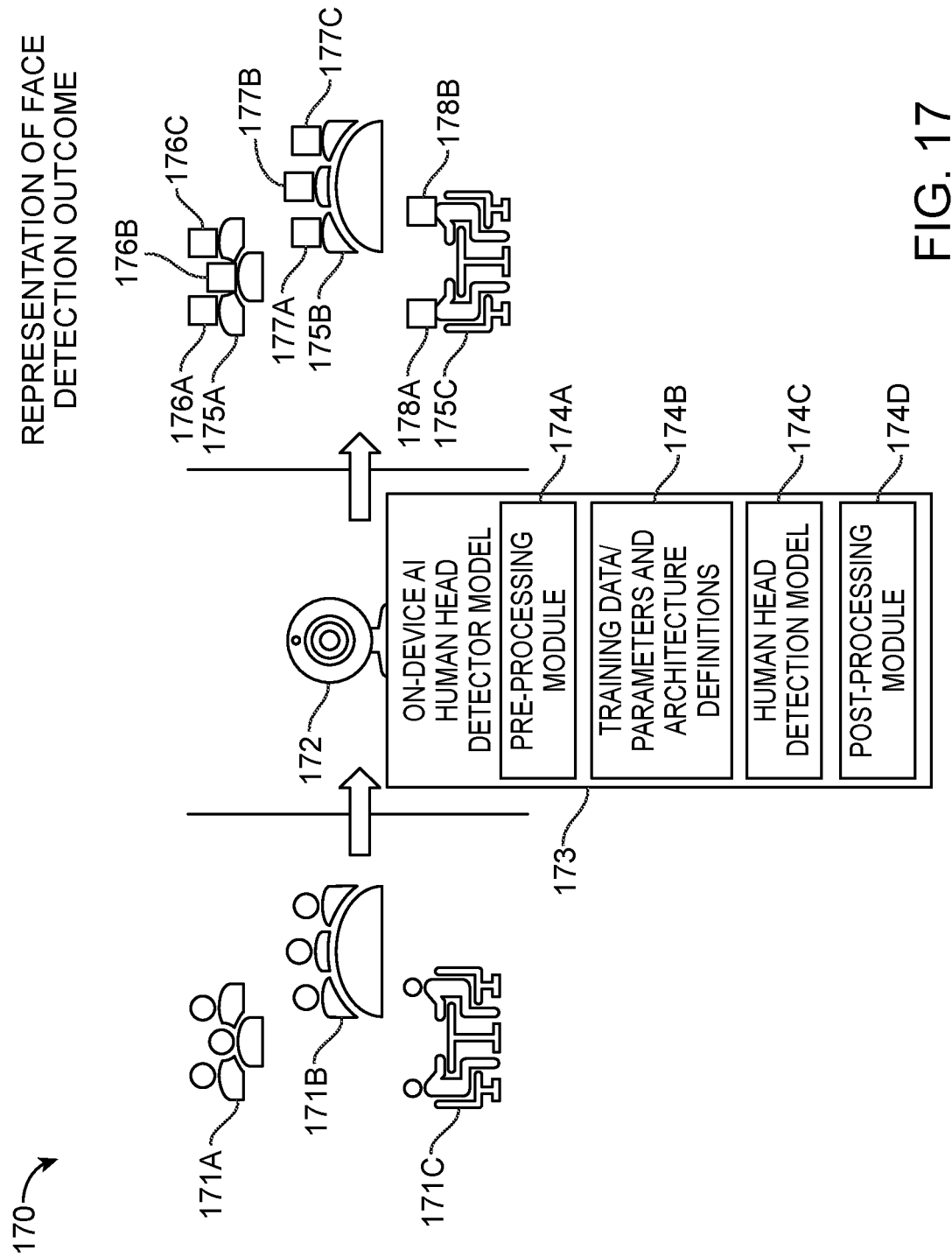
FIG. 17 is a simplified diagrammatic depiction of a head detection system in accordance with selected embodiments of the present disclosure.

To provide additional details for an improved understanding of selected embodiments of the present disclosure, reference is now made to FIG. 17 which depicts a simplified flow diagram of a human head detector system 170 which processes incoming room-view video frame images 171 of a meeting room scene with a head detector machine learning model 173 to detect and display human heads with corresponding head bounding boxes 176-178. As depicted, each incoming room-view video frame image 171 may be captured a camera in the video conferencing system. For example, a first view of the meeting participants is captured by a first camera in a first profile image 171A, a second camera captures a second profile image 171B, and a third camera captures a third profile image 171C. Each incoming room-view video frame image 171A-C may be processed with an on-device artificial intelligence (AI) human head detector model 173 that may be located at the respective camera which captures the video frame images. However, in other embodiments, the AI human head detector model 173 may be located at a remote or centralized location. Wherever located, the AI human head detector model 173 may be configured with a plurality of processing modules 174 which implement a machine learning model which is trained to detect or classify human heads from the incoming video frame images, and to identify, for each detected human head, a head bounding box with specified image plane coordinate and dimension information.

In the depicted example embodiment, the AI human head detector model 173 may include a first pre-processing module 174A that is configured to apply image pre-processing (such as color conversion, image scaling, image enhancement, image resizing, etc.) so that the input video frame image is prepared for subsequent AI processing. In addition, a second module 174B may be configured with training data parameters or model architecture definitions which may be pre-defined and used to train and define the human head detection model 174C to accurately detect or classify human heads from the incoming video frame images. In selected embodiments, the human head detection model 174C may be implemented as a model inference software or machine learning model, such as a Convolutional Neural Network (CNN) model that is specially trained for video codec operations to detect heads in an input image by generating pixel-wise locations for each detected head and by generating, for each detected head, a corresponding head bounding box which frames the detected head. Finally, the AI human head detector model 173 may include a post-processing module 174D which is configured to apply image post-processing to the output from the AI human head detector model 174C to make the processed images suitable for human viewing and understanding. In addition, the post-processing module 174D may also reduce the size of the data outputs generated by the human head detection model 174C, such as by consolidating or grouping a plurality of head bounding boxes or frames which are generated from a single meeting participant so that only a single head bounding box or frame is specified.

Based on the results of the processing modules 174, the AI human head detector model 173 may generate output video frame images 175 in which the detected human heads are framed with corresponding head bounding boxes 176-178. As depicted, the first output video frame image 175A includes head bounding boxes 176A-C which are superimposed around each detected human head. In addition, the second output video frame image 175B includes head bounding boxes 177A-C which are superimposed around each detected human head, and the third output video frame image 175C includes head bounding boxes 178A-B which are superimposed around each detected human head. As will be appreciated, the AI human head detector model 173 may be configured to specify each head bounding box using any suitable pixel-based parameters, such as defining the x and y pixel coordinates of a head bounding box or frame in combination with the height and width dimensions of the head bounding box or frame. In addition, the AI human head detector model 173 may be configured to specify a distance measure between the camera location and the location of the detected human head using any suitable measurement technique. Though not shown, it will be appreciated that the AI human head detector model 173 may also compute, for each head bounding box, a corresponding confidence measure or score which quantifies the model's confidence that a human head is detected.

In selected embodiments of the present disclosure, the AI human head detector model 173 may specify all head detections in the data structure that holds the coordinates of each detected human head along with their detection confidence.

In the above embodiments, the human head data structure for n human heads may be generated as follows:

$$\begin{Bmatrix} x_1 y_1 & \text{Width}_1 & \text{Height}_1 & \text{Score}_1 \\ x_2 y_2 & \text{Width}_2 & \text{Height}_2 & \text{Score}_2 \\ & \cdots & \\ x_n y_n & \text{Width}_n & \text{Height}_n & \text{Score}_n \end{Bmatrix}$$

where $x_i$ and $y_i$ refer to the image plane coordinates of the $i^{th}$ detected head, and where $\text{Width}_i$ and $\text{Height}_i$ refer to the width and height information for the head bounding box of the $i^{th}$ detected head. In addition, $\text{Score}_i$ is in the range (0, 100] and reflect confidence in % for the $i^{th}$ detected head. This data structure may be used as an input to various applications, such as framing, tracking, composing, recording, switching, reporting, encoding, etc. In this example data structure, the first detected head is in the image frame in a head bounding box located at pixel location parameters $x_1$, $y_1$ and extending laterally by $\text{Width}_1$ and vertically down by $\text{Height}_1$. In addition, the second detected head is in the image frame in a head bounding box located at pixel location parameters $x_2$, $y_2$ and extending laterally by $\text{Width}_2$ and vertically down by $\text{Height}_2$, and the $n^{th}$ detected head is in the image frame in a head bounding box located at pixel location parameters $x_n$, $y_n$ and extending laterally by $\text{Width}_n$ and vertically down by $\text{Height}_n$.

This human head data structure may then be used as an input to the distance estimation algorithm that takes the {Width, Height} parameters of each head bounding box to pick the best matching distance in terms of meeting room coordinates $\{x_{ROOM}, y_{ROOM}\}$ from the look-up table by first using one of the Width or Height parameters with a first lookup table, and then using the other parameter as a tie breaking if multiple meeting room coordinates $\{x_{ROOM}, y_{ROOM}\}$ are determined by the one. The human head data structure itself may then be modified to also embed the distance information with each Head, resulting in a modified human head data structure that looks like the following:

$$\begin{Bmatrix} x_1 y_1 & \text{Width}_1 & \text{Height}_1 & \text{Score}_1 & x_{ROOM1} & y_{ROOM1} \\ x_2 y_2 & \text{Width}_2 & \text{Height}_2 & \text{Score}_2 & x_{ROOM2} & y_{ROOM2} \\ & & \cdots & & \\ x_n y_n & \text{Width}_n & \text{Height}_n & \text{Score}_n & x_{ROOMn} & y_{ROOMn} \end{Bmatrix}$$

where $\{x_{ROOM1}, y_{ROOM1}\}$, $\{x_{ROOM2}, y_{ROOM2}\}$, ..., $\{x_{ROOMn}, y_{ROOMn}\}$ specify the distance of $\text{Head}_1$, $\text{Head}_2$, ..., $\text{Head}_n$, from the camera, respective, in 2D coordinates.

Figure 18:
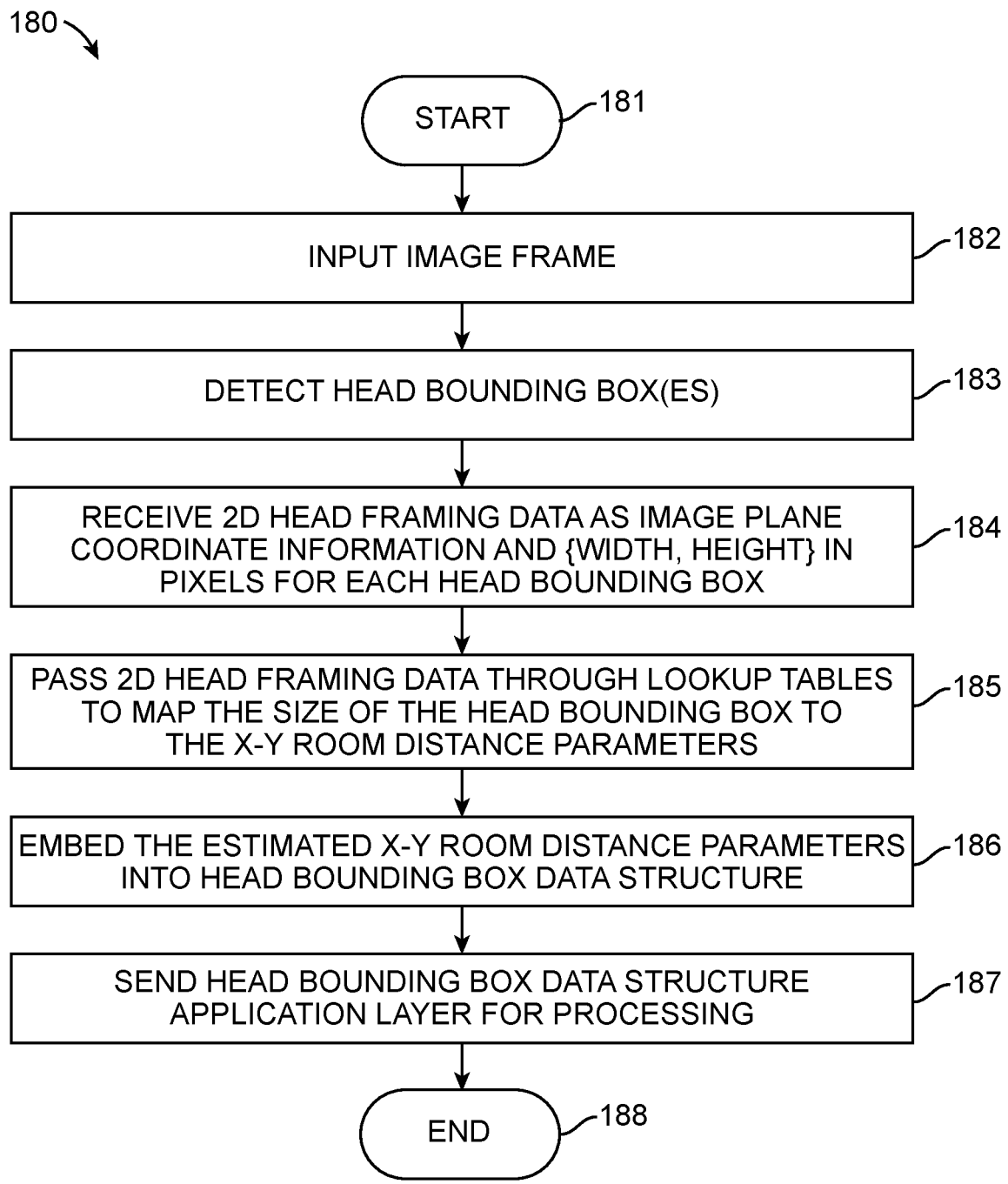
FIG. 18 is a simplified flowchart showing the control logic for a head distance detection computational flow in accordance with selected embodiments of the present disclosure.

To provide additional details for an improved understanding of selected embodiments of the present disclosure, reference is now made to FIG. 18 which depicts a simplified flowchart 180 showing the control logic for a head distance detection computational flow. The order in which the control logic steps are described is not intended to be construed as a limitation, and any number of the described method steps may be combined in any order to implement the control logic and method steps.

At step 181, the method starts when a video/web conference call meeting is started in a conference room or area in which a video conference system is located to run the video/web conference call meeting and image frames of the room scene are input or captured by one or more cameras in the room. At step 182, an input image frame is captured and processed by the camera. Such processing may include one or more image pre-processing steps that are applied to the input image frame. Examples of such image pre-processing include, but are not limited to, color conversion between YUV and RGB color spaces, image scaling, image resizing, and the like.

At step 183, head bounding boxes are detected for any meeting participants identified in the input image frame. While any suitable technique may be used to detect head bounding boxes, selected embodiments of the present disclosure apply an artificial intelligence head detection model the input image frame to generate output tensors which identify one or more human heads in the input image frame. In selected embodiments, the head detection model may be run as a machine learning model. As disclosed herein, convolutional neural networks—also known as artificial neural networks (ANNs) or simulated neural networks (SNNs)—are a subset of machine learning which may be used by a video codec to detect heads in an input image and to generate output tensors that identify human heads from the input image frame.

A convolutional neural network is a class of deep neural network which can be applied analyzing audio voice data. A deep neural network is an artificial neural network with multiple layers between the input and output layers. Artificial neural networks are computing systems inspired by the biological neural networks that constitute animal brains. Artificial neural networks exist as code being executed on one or more processors. An artificial neural network is based on a collection of connected units or nodes called artificial neurons, which mimic the neurons in a biological brain. Each connection, like the synapses in a biological brain, can transmit a 'signal' to other neurons. An artificial neuron that receives a signal then processes it and can signal neurons connected to it. The signal at a connection is a real number, and the output of each neuron is computed by some non-linear function of the sum of its inputs. The connections are called edges. Neurons and edges have weights, the value of which is adjusted as 'learning' proceeds and/or as new data is received by a state system. The weight increases or decreases the strength of the signal at a connection. Neurons may have a threshold such that a signal is sent only if the aggregate signal crosses that threshold. In addition, one or more image post-processing steps may be applied to the results output from the head detection model. Examples of such image post-processing include, but are not limited to, converting the tensors to head bounding boxes with confidence scores, representing head bounding boxes with image plane coordinates, filtering or removing any tensors which correspond to human head profiles that are not frontal views (e.g., discarding side profile and/or back of head views).

At step 184, two-dimensional head framing data for each detected human head bounding box is extracted or received as image plane coordinate information, along with the width and height measures in pixels. In selected embodiments, each camera outputs the 2D head framing data by generating a head bounding box data structure that includes image plane coordinates, height, and width dimension parameters, associated confidence scores for each human head detected in the input image frame.

At step 185, the 2D head framing data is passed through one or more lookup tables to map the size of each detected human head bounding box to a corresponding pair of x-y room distance parameters. Generally, 2D head framing data structure provides the width and height measures for each head bounding box as inputs to a table of height and/or width head pixel count values to pick the best-matching meeting room coordinates $\{x_{ROOM}, y_{ROOM}\}$ from the look-up table by first using one of the parameters (width or height), and then using the other parameter as a tie breaking if multiple meeting room coordinates $\{x_{ROOM}, y_{ROOM}\}$ are determined by the one.

At step 186, the estimated X-Y room distance parameters are embedded into the head bounding box data structure, and at step 187, the head bounding box data structure is sent to the application layer for further processing.

Figure 19:
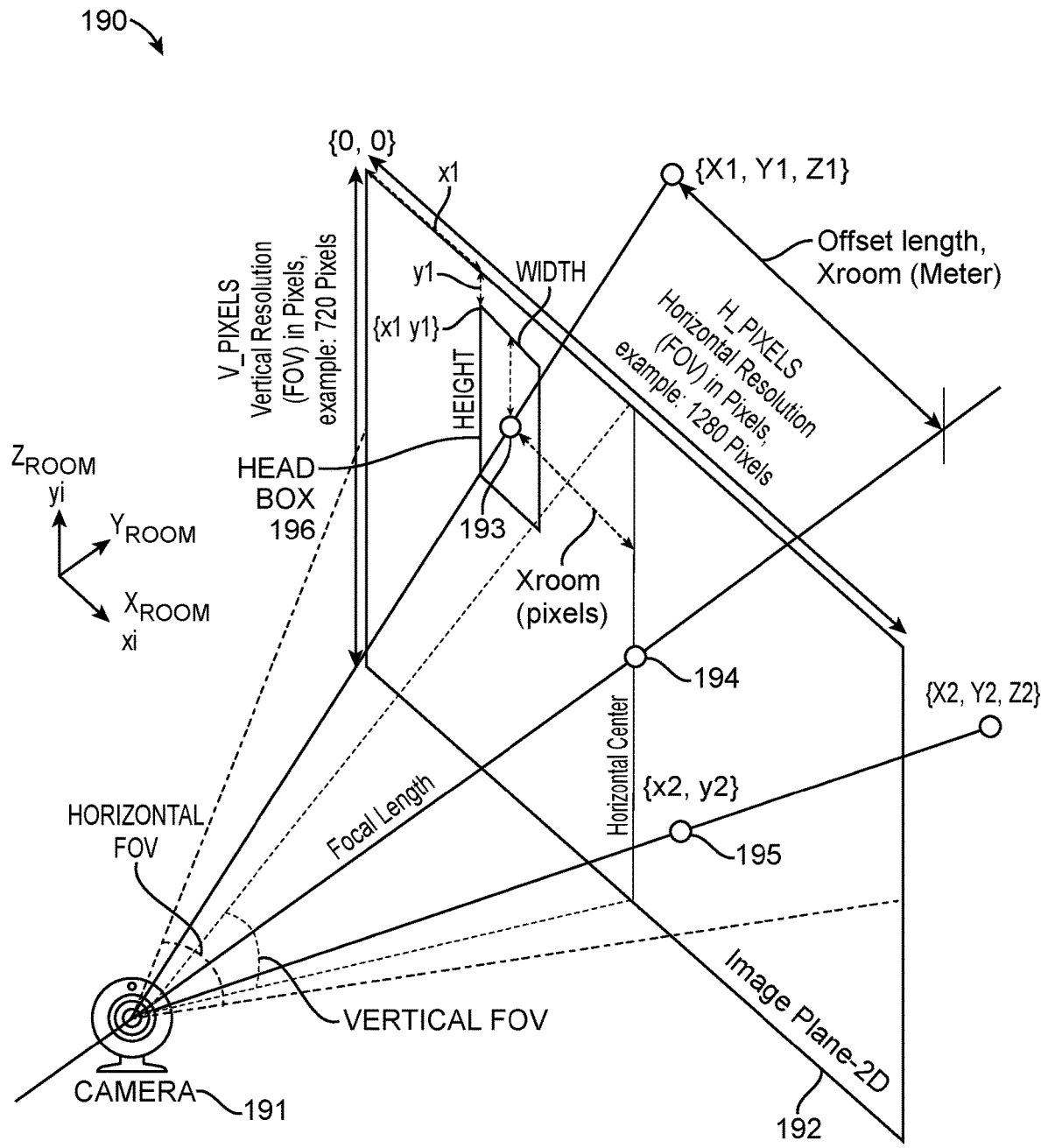
FIG. 19 is a perspective view of a camera and a defined head bounding box in an image plane to illustrate how to calculate a horizontal or pan room distance $x_{ROOM}$ from a center line of sight of camera focal point to the center of the head bounding box in accordance with selected embodiments of the present disclosure.

To provide additional details for an improved understanding of selected embodiments of the present disclosure, reference is now made to the FIG. 19 which provides a perspective view 190 of a camera 191 and a two-dimensional image plane 192 to illustrate how to calculate a horizontal or pan room distance Xroom (meter) from a pixel offset length Xroom (pixel) between the center line of sight camera focal point to the center of the head bounding box 196 by using a pixel-to-meters conversion factor. In the depicted two-dimensional image plane 192, a plurality of two-dimensional coordinate points 193-195 are defined with image plane coordinates $\{xi, yi\}$. At a first image plane point 193 $\{x1, y1\}$, the starting coordinate point for the head bounding box 196 is defined in the image plane 192, where it can be seen that the first image plane point 193 $\{x1, y1\}$ corresponds to the meeting room coordinate point $\{X1, Y1, Z1\}$. At the second image plane point 194 $\{xi=H\_PIXELS/2, yi=V\_PIXELS/2\}$, the center line of sight camera focal point is defined with the pixel locations at the midpoint of the 2D image plane 192. At a third image plane point 195 $\{x2, y2\}$, the third image plane point 193 $\{x2, y2\}$ corresponds to the meeting room coordinate point $\{X2, Y2, Z2\}$. In addition, the head bounding box 196 is defined with reference to the starting coordinate point $\{x1, y1\}$ for the head bounding box 196, a Width dimension (measured along the xi axis), and a Height dimension (measured along the yi axis). To locate the horizontal or pan room distance $x_{ROOM}$ (meter) from the center line of sight camera focal point, the horizontal or pan room distance $x_{ROOM}$ (pixel) from the center line of sight camera focal point 194 is determined as a pixel value in the x-axis of the 2D image plane 192 by first computing the x-coordinate of the center point 193 of the head bounding box 196 (XHead_Center=x1+Width/2). Next, the computed pixel value in the x-axis of the 2D image plane 192 is converted to a distance measure for the meeting room Xroom (meter) by computing:

$$X\text{room (meter)}=(H\_center-X\text{Head\_Center})*H\_HEAD/\text{Width}$$

where H_center=(H_PIXELS/2.0) (to define the center of the 2D Image Plane 192 measured along the xi axis in pixels), where XHead_Center=x1+Width/2 (to defined the x-coordinate pixel value for the center point 193 of the head bounding box 196), where H_HEAD is the median head width in meters, and where Width is the width of the head bounding box in pixels. As seen from the foregoing, the distance measure for Xroom (meter) is computed as Xroom Offset in pixels*Median Head Width in Meters/Head Width in Pixels.

Figure 20:
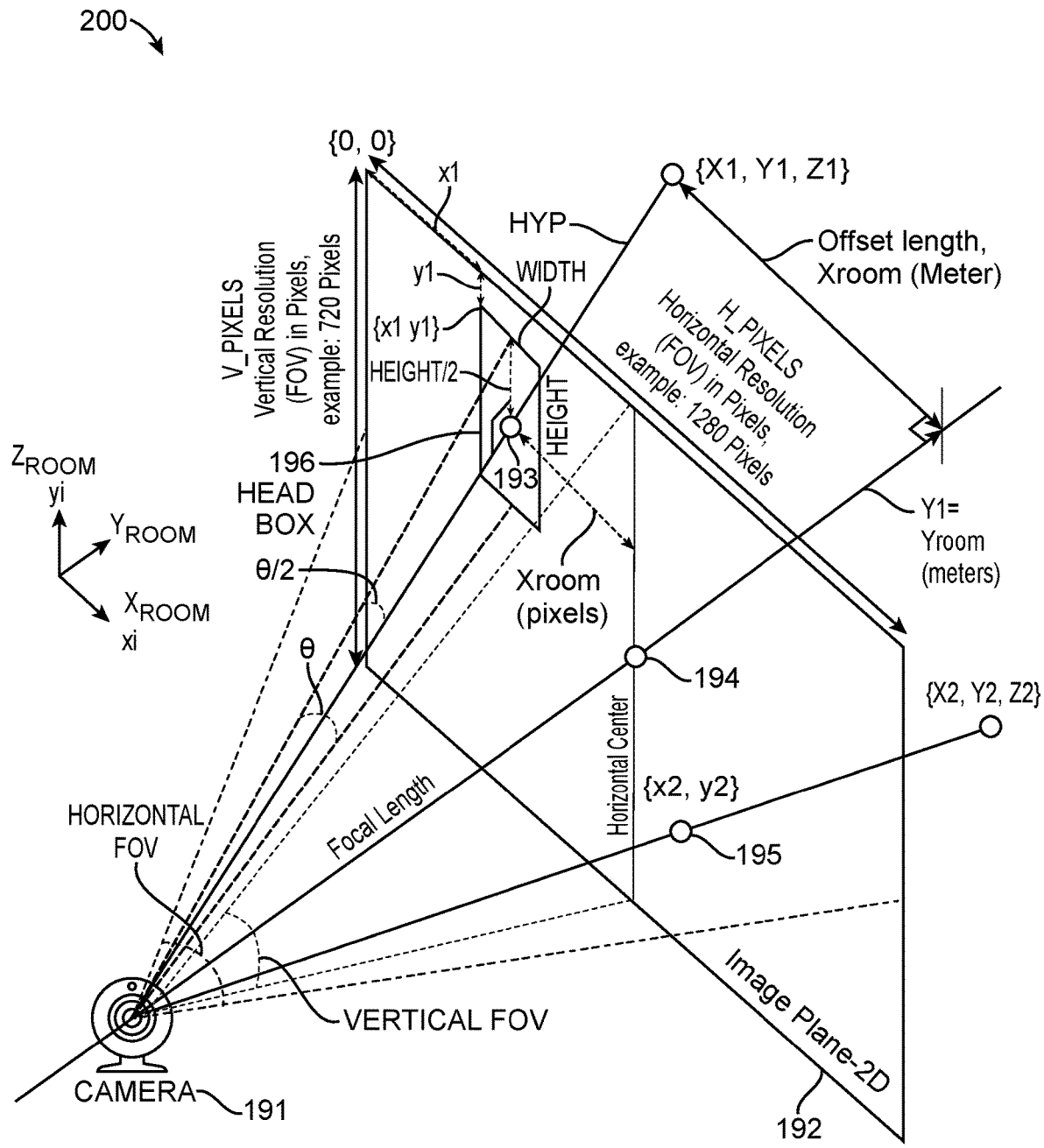
FIG. 20 is a perspective view of a camera and the two-dimensional image plane to illustrate how to calculate a vertical or depth room distance Yroom (meters) to the meeting participant location from the distance measure Xroom (meters) by calculating a direct distance measure HYP between the camera and the meeting participant location.

To provide additional details for an improved understanding of selected embodiments of the present disclosure, reference is now made to the FIG. 20 which provides a perspective view 200 of a camera 191 and the two-dimensional image plane 192 to illustrate how to calculate a vertical or depth room distance Yroom (meters) to the meeting participant location from the distance measure Xroom (meters) by calculating a direct distance measure HYP between the camera 191 and the meeting participant location. Again, the depicted two-dimensional image plane 192 includes a plurality of two-dimensional coordinate points 193-195 that are defined with image plane coordinates {xi, yi} as described hereinabove. In addition, the head bounding box 196 is defined with reference to the starting coordinate point {x1, y1} for the head bounding box 196, a Width dimension (measured along the xi axis), and a Height dimension (measured along the yi axis). To locate the vertical or depth room distance Yroom (meters) from the camera 191, the vertical angular extent (θ) for the head bounding box 196 is computed as θ=Height*V_FOV/V_PIXELS, where Height is the height of the head bounding box in pixels, where V_FOV is the Vertical FOV in degrees, and where V_PIXELS is the Vertical FOV in Pixels. Next, the vertical angular extent for the upper half of the head bounding box is computed (θ/2) and used to derive the direct distance measure HYP between the camera 191 and the meeting participant location, HYP=V_HEAD/(2× tan(θ/2)), where HYP is the direct distance measure to the meeting participant location at pan angle $\phi_{PAN}$. Finally, the vertical or depth room distance Yroom (meters) is derived from the direct distance measure HYP and the distance measure Xroom (meters) using Pythagorean's Theorem, Yroom=$\sqrt{HYP^2 - Xroom^2}$.

To provide additional details for an improved understanding of selected embodiments of the present disclosure, reference is now made to the following example pseudo coding sequence for calculating the meeting room coordinates {Xroom, Yroom}. As disclosed, the following pseudo code input values are defined by of example:

V_HEAD=0.225; // Median Head height in Meters
H_HEAD=0.139; // Median Head Width in Meters
V_PIXELS=720; //Vertical Field of View in Pixels
H_PIXELS=1280; //Horizontal Field of View in Pixels
V_FOV=Vertical Field of View in Degrees
H_FOV=Horizontal Field of View in Degrees As described hereinabove with reference to the human head data structure, each detected human head may be represented as {X, Y, Width, Height} in an image plane where X=Left pixel coordinate in x-axis, Y=Top pixel coordinate in the y-axis, Width=Width of Head box in Pixels, and Height=Height of Head box in Pixels. In addition, the top left pixel coordinates of the Image Plane={0,0}.

To calculate the Xroom offset length in meters from the center focal line of the camera to the meeting participant location along the $x_{ROOM}$ meeting room axis, the following pseudo code is defined:

XHead_Center=X+Width/2; //Center of Head in x-Direction,Pixels//

H_center=(H_PIXELS/2.0); //Center of Image in Horizontal,i.e.,X-direction,Pixels//

Xroom=(H_center-XHead_Center)*H_HEAD/Width; //Offset in pixels*Median Head Width in Meter/Head Width in Pixel//

In order to calculate the Yroom distance in meters from the camera to the meeting participant location along the $y_{ROOM}$ meeting room axis, the following pseudo code is defined:

Theta=Height*V_FOV/V_PIXELS; //Theta, i.e., Angular Extent=Head height in Pixels*Vertical FOV in degree/Vertical FOV in Pixels// tdeg=tan(RADIAN(Theta/2.0)); //define the variable tdeg// hypotenuse=(V_HEAD/(2.0*tdeg)); //Hypotenuse at Pan Angle $\phi_{PAN}$//

Yroom=SquareRoot(hypotenuse*hypotenuse-Xroom*Xroom); //Use Pythagorean's Theorem to solve for Yroom//

Figure 21:
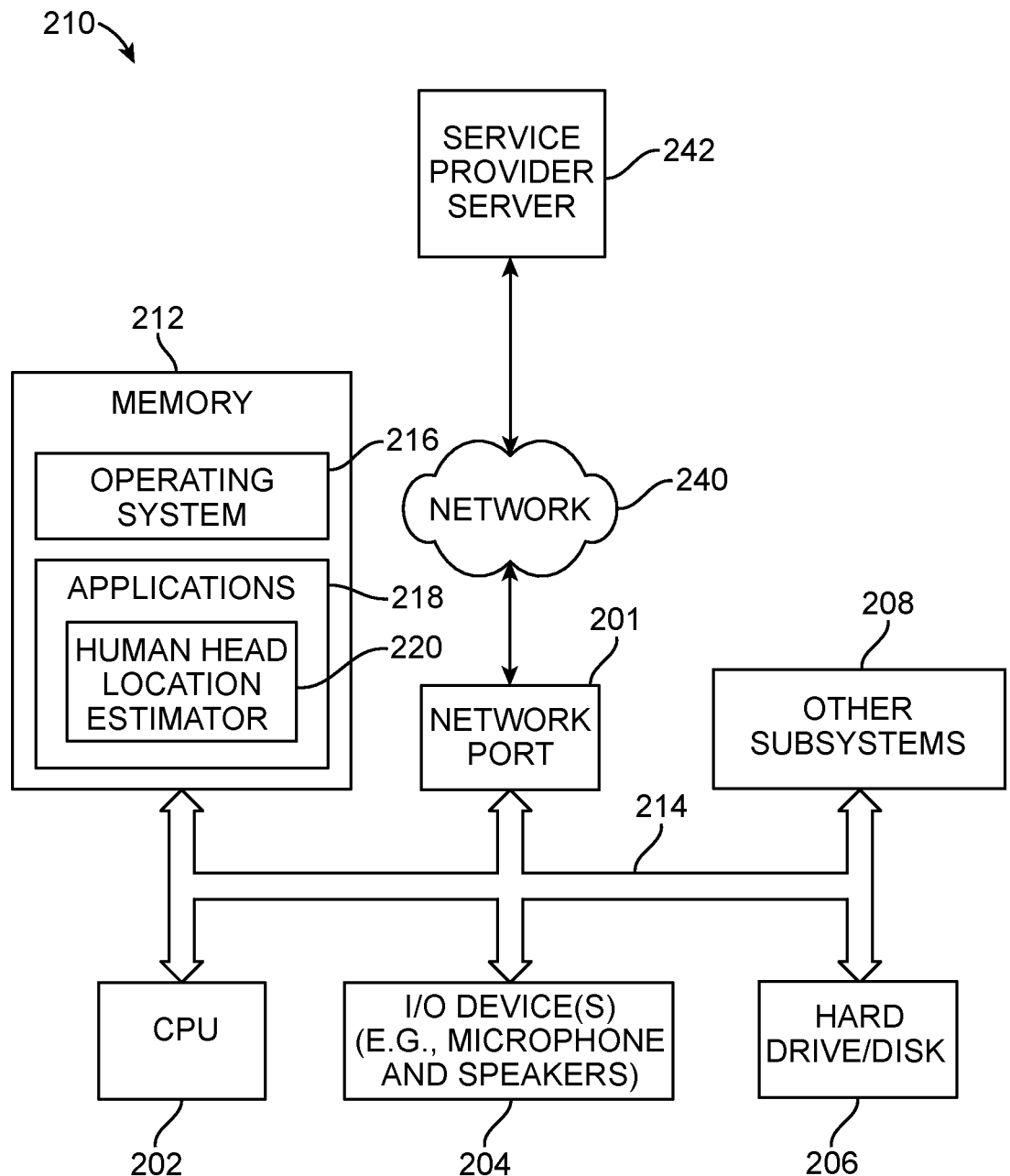
FIG. 21 is a schematic block diagram illustrating components of an information handling system in accordance with embodiments of the present invention.

Referring now to FIG. 21, there is depicted a schematic block diagram illustrating components of an information handling system 210 that can be used to implement selected embodiments of the present disclosure. In selected embodiments, the information handling system 210 may implement devices such as a notebook or laptop personal computer (PC), a smartphone, or other computing devices, such as the smart camera devices or video codec devices as described herein.

As depicted, the information handling system 210 includes a processor (e.g., central processor unit or "CPU") 202, input/output (I/O) devices 204, such as a microphone, a speaker(s), a keyboard, a video/display, a mouse, and associated controllers, a hard drive or disk storage 206, and various other subsystems 208. In addition, the information handling system 210 may include a network port 201 operable to connect to a network 2240, where network 240 can include one or more wired and wireless networks, including the Internet. Network 240 is likewise accessible by a service provider server 242. The information handling system 210 may also include system memory 212, which is interconnected to the foregoing via one or more buses 214. System memory 212 can be implemented as hardware, firmware, software, or a combination of such. System memory 212 further includes an operating system (OS) 216. Embodiments provide for the system memory 212 to include applications 218.

In selected embodiments, the system memory 212 may be implemented with flash memory and/or RAM which stores modules of different functionality in the form of software and firmware, generically programs, for controlling the system 210. For example, the memory 212 may include a human head location estimator 220 which may include a machine learning human head detector model and head bounding box extraction application or software module for accurately determining the location of meeting participants in a video conference meeting room in a two-dimensional coordinate plane by using machine learning techniques to identify, for each detected human head, a head bounding box with specified image plane coordinate and dimension information for an image plane, and then performing a reverse table look-up operation to extract two-dimensional room distance parameters specifying the location for each meeting participant in the two-dimensional coordinate plane.

By now it will be appreciated that there is disclosed herein a computer implemented method, system, and non-transitory processor readable memory containing programs that perform a method for determining location information for one or more meeting participants in conference room. In the disclosed methodology, an input frame image of the conference room is generated or captured by a camera. The disclosed methodology also detects, from the input frame image, a human head for each meeting participant captured in the input frame image by applying a machine learning human head detector model to said input image frame. In addition, the disclosed methodology generates, from each detected human head, a head bounding box which surrounds the detected human head and identifies a corresponding meeting participant. In selected embodiments, each human head is detected by applying image pre-processing to each input frame image to generate a pre-processed frame image and applying a machine learning human head detector model to each a pre-processed frame image to generate an output tensor for each detected human head. In such embodiments, the head bounding box is generated by applying image post-processing to convert each output tensor to a head bounding box which surrounds a corresponding detected human head. The disclosed methodology also applies the pixel width measure and pixel height measure extracted from each head bounding box to one or more reverse lookup tables to extract meeting room coordinates for each meeting participant identified by a corresponding head bounding box. In selected embodiments, disclosed methodology also computes or retrieves the one or more reverse lookup tables which include a head height reverse lookup table and a head height reverse lookup table. As disclosed, the disclosed head width reverse lookup table includes a plurality of head width pixel values calculated for a predetermined head width at a plurality of room pan angles, where each head width pixel value is indexed by a corresponding meeting room width coordinate and a meeting room depth coordinate. In addition, the head height reverse lookup table includes a plurality of head height pixel values calculated for a predetermined head height at a plurality of room pan angles, where each head height pixel value is indexed by a meeting room width coordinate and a meeting room depth coordinate. In selected embodiments, the plurality of head height pixel values are computed as $((2 \text{ arctan}(V/(2\sqrt{y_{ROOM}^2 + x_{ROOM}^2})))/\text{Vertical\_FOV\_Angle}) \times \text{Vertical\_FOV\_Pixels}$, where $y_{ROOM}$ is meeting room depth coordinate, where $x_{ROOM}$ is meeting room width coordinate, where V is the predetermined head height, where Vertical_FOV_Angle is an angular vertical field of view measure for the camera, and where Vertical_FOV_Pixels is an vertical field of view pixel resolution measure for the camera. In selected embodiments, disclosed methodology also includes generating, from each detected human head, a head bounding box data structure may include a first pair of image plane coordinates, a head box width dimension, and a head box height dimension for a corresponding head bounding box. In such embodiments, the disclosed methodology also includes generating, for each detected human head, an output head bounding box data structure may include the first pair of image plane coordinates, the head box width dimension, the head box height dimension, and the extracted meeting room coordinates for each meeting participant identified by the corresponding head bounding box In another form, there is disclosed herein a system and methodology for determining location information for one or more meeting participants in conference room. The disclosed system includes one or more first processors, a first data bus coupled to the one or more first processors, and a non-transitory, computer-readable storage medium embodying computer program code and being coupled to the first data bus, where the computer program code interacts with a plurality of computer operations and includes first instructions executable by the one or more first processors. In particular, the first instructions are configured for generating an input frame image of the conference room. In addition, the first instructions are configured for detecting, from the input frame image, a human head for each meeting participant captured in the input frame image by applying a machine learning human head detector model to said input image frame. In selected embodiments, the first instructions are configured to detect a human head by applying image pre-processing to the input frame image to generate a pre-processed frame image, and then applying a machine learning human head detector model to each pre-processed frame image to generate an output tensor for each detected human head. In addition, the first instructions are configured for generating, from each detected human head, a head bounding box which surrounds the detected human head and identifies a corresponding meeting participant. In selected embodiments, the first instructions are configured to generate the head bounding box by applying image post-processing to convert each output tensor to a head bounding box which surrounds a corresponding detected human head. In addition, the first instructions are configured for extracting, from each head bounding box, a pixel width measure and pixel height measure for the head bounding box. In addition, the first instructions are configured for processing the pixel width measure and pixel height measure extracted from each head bounding box to generate meeting room coordinates for each meeting participant identified by a corresponding head bounding box. In selected embodiments, the first instructions are configured for processing the pixel width measure and pixel height measure by applying the pixel width measure and pixel height measure to one or more reverse lookup tables to extract meeting room coordinates for each meeting participant identified by a corresponding head bounding box. In other selected embodiments, the first instructions are configured for processing the pixel width measure and pixel height measure to estimate meeting room coordinates for each meeting participant identified by a corresponding head bounding box based on mathematical computations which use a vertical angular field of view, a horizontal angular field of view, a vertical resolution field of view, and a horizontal resolution field of view for an input camera device which captures the input frame image. In the disclosed system and methodology, the first instructions are configured to compute or retrieve one or more reverse lookup tables for processing the pixel width measure and pixel height measure to generate meeting room coordinates. In such embodiments, the one or more reverse lookup tables may include a head height reverse lookup table may include a plurality of head height pixel values calculated for a predetermined head height at a plurality of room pan angles, where each head height pixel value is indexed by a meeting room width coordinate and a meeting room depth coordinate. In addition, the one or more reverse lookup tables may include a head width reverse lookup table having a plurality of head width pixel values calculated for a predetermined head width at a plurality of room pan angles, where each head width pixel value is indexed by a corresponding meeting room width coordinate and a meeting room depth coordinate. In such embodiments, the plurality of head height pixel values may be computed as $((2 \text{ arctan}(V/(2\sqrt{y_{ROOM}^2 + x_{ROOM}^2})))/\text{Vertical\_FOV\_Angle}) \times \text{Vertical\_FOV\_Pixels}$, where $y_{ROOM}$ is meeting room depth coordinate, where $x_{ROOM}$ is meeting room width coordinate, where V is the predetermined head height, where Vertical_FOV_Angle is an angular vertical field of view measure for the camera, and where Vertical_FOV_Pixels is an vertical field of view pixel resolution measure for the camera. In selected embodiments, the first instructions may also be configured to generate, from each detected human head, a head bounding box data structure which includes a first pair of image plane coordinates, a head box width dimension, and a head box height dimension for a corresponding head bounding box. In addition, the first instructions may be configured to generate, for each detected human head, an output head bounding box data structure which includes the first pair of image plane coordinates, the head box width dimension, the head box height dimension, and the extracted meeting room coordinates for each meeting participant identified by the corresponding head bounding box.

In yet another form, there is disclosed herein a computer implemented method, system, and non-transitory processor readable memory containing programs that when executed cause a processor or processors to perform a method for determining location information for one or more meeting participants in conference room. In the disclosed method and system, the executed programs generate an input frame image of the conference room by a camera. In addition, the executed programs detect, from the input frame image, a human head for each meeting participant captured in the input frame image by applying a machine learning human head detector model to said input image frame. The executed programs also generate, from each detected human head, a head bounding box which surrounds the detected human head and identifies a corresponding meeting participant. In addition, the executed programs extract, from each head bounding box, a pixel width measure and pixel height measure for the head bounding box. The executed programs also process the pixel width measure and pixel height measure extracted from each head bounding box to generate meeting room coordinates for each meeting participant identified by a corresponding head bounding box. In selected embodiments, the executed programs process the pixel width measure and pixel height measure by applying the pixel width measure and pixel height measure to one or more reverse lookup tables to extract meeting room coordinates for each meeting participant identified by a corresponding head bounding box. In such embodiments, the reverse lookup tables may include a head height reverse lookup table having a plurality of head height pixel values calculated for a predetermined head height at a plurality of room pan angles, where each head height pixel value is indexed by a meeting room width coordinate and a meeting room depth coordinate. In addition, the reverse lookup tables may include a head width reverse lookup table having a plurality of head width pixel values calculated for a predetermined head width at a plurality of room pan angles, where each head width pixel value is indexed by a corresponding meeting room width coordinate and a meeting room depth coordinate. In other selected embodiments, the executed programs process the pixel width measure and pixel height measure by estimating meeting room coordinates for each meeting participant identified by a corresponding head bounding box based on mathematical computations which use a vertical angular field of view, a horizontal angular field of view, a vertical resolution field of view, and a horizontal resolution field of view for an input camera device which captures the input frame image.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Unless stated otherwise, terms such as "first" and "second" are used to arbitrarily distinguish between the elements such terms describe. Thus, these terms are not necessarily intended to indicate temporal or other prioritization of such elements.

As will be appreciated by one skilled in the art, the present disclosure may be embodied as a method, system, or computer program product. Accordingly, embodiments of the present disclosure may be implemented entirely in hardware, entirely in software (including firmware, resident software, micro-code, etc.) or in an embodiment combining software and hardware. These various embodiments may all generally be referred to herein as a "circuit," "module," or "system." Furthermore, embodiments of the present disclosure may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosure are described with reference to flowchart illustrations and/or step diagrams of methods, apparatus (systems) and computer program products according to embodiments of the disclosure. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof.

It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Although the disclosure is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The various examples described are provided by way of illustration and should not be construed to limit the scope of the disclosure. Various modifications and changes can be made to the principles and examples described herein without departing from the scope of the disclosure and without departing from the claims which follow.

What is claimed is:

1. A method for determining location information for one or more meeting participants in conference room, comprising:
   generating an input frame image of the conference room by a camera;
   detecting, from the input frame image, a human head for each meeting participant captured in the input frame image by applying a machine learning human head detector model to said input image frame;
   generating, from each detected human head, a head bounding box which surrounds the detected human head and identifies a corresponding meeting participant;
   extracting, from each head bounding box, a pixel width measure and pixel height measure for the head bounding box; and
   applying the pixel width measure and pixel height measure extracted from each head bounding box to one or more reverse lookup tables to extract meeting room coordinates for each meeting participant identified by a corresponding head bounding box,
   wherein detecting a human head comprises:
      applying image pre-processing to each input frame image to generate a pre-processed frame image; and
      applying a machine learning human head detector model to each to pre-processed frame image to generate an output tensor for each detected human head,
   wherein generating the head bounding box comprises applying image post-processing to convert each output tensor to a head bounding box which surrounds a corresponding detected human head.

2. The method of claim 1, further comprising computing or retrieving the one or more reverse lookup tables, comprising:
   a head height reverse lookup table comprising a plurality of head height pixel values calculated for a predetermined head height at a plurality of room pan angles, where each head height pixel value is indexed by a meeting room width coordinate and a meeting room depth coordinate; and
   a head width reverse lookup table comprising a plurality of head width pixel values calculated for a predetermined head width at a plurality of room pan angles, where each head width pixel value is indexed by a corresponding meeting room width coordinate and a meeting room depth coordinate.

3. The method of claim 2, where the plurality of head height pixel values are computed as:

$$\left( \frac{2\arctan\left(\frac{v}{\sqrt[2]{Y_{ROOM}^2 + X_{ROOM}^2}}\right)}{\text{Vertical}_{FOV_{Angle}}} \right) \times \text{Vertical\_FOV\_Pixels},$$

where $y_{ROOM}$ is meeting room depth coordinate, where $x_{ROOM}$ is meeting room width coordinate,
where V is the predetermined head height,
where Vertical_FOV_Angle is an angular vertical field of view measure for the camera, and
where Vertical_FOV_Pixels is a vertical field of view pixel resolution measure for the camera.

4. The method of claim 1, further comprising generating, from each detected human head, a head bounding box data structure comprising a first pair of image plane coordinates, a head box width dimension, and a head box height dimension for a corresponding head bounding box.

5. The method of claim 4, further comprising generating, for each detected human head, an output head bounding box data structure comprising the first pair of image plane coordinates, the head box width dimension, the head box height dimension, and the extracted meeting room coordinates for each meeting participant identified by the corresponding head bounding box.

6. A system for determining location information for one or more meeting participants in conference room, comprising:
   one or more first processors;
   a first data bus coupled to the one or more first processors; and
   a non-transitory, computer-readable storage medium embodying computer program code, the non-transitory, computer-readable storage medium being coupled to the first data bus, the computer program code interacting with a plurality of computer operations and comprising first instructions executable by the one or more first processors and configured for:

generating an input frame image of the conference room;

detecting, from the input frame image, a human head for each meeting participant captured in the input frame image by applying a machine learning human head detector model to said input image frame;

generating, from each detected human head, a head bounding box which surrounds the detected human head and identifies a corresponding meeting participant;

extracting, from each head bounding box, a pixel width measure and pixel height measure for the head bounding box; and processing the pixel width measure and pixel height measure extracted from each head bounding box to generate meeting room coordinates for each meeting participant identified by a corresponding head bounding box, wherein the first instructions executable by the one or more first processors are configured to generate, for each detected human head, an output head bounding box data structure comprising:
- a first pair of image plane coordinates,
- a head box width dimension,
- a head box height dimension, and
- the extracted meeting room coordinates for each meeting participant identified by the corresponding head bounding box.

7. The system of claim 6, wherein the first instructions executable by the one or more first processors are configured for processing the pixel width measure and pixel height measure by applying the pixel width measure and pixel height measure to one or more reverse lookup tables to extract meeting room coordinates for each meeting participant identified by a corresponding head bounding box.

8. The system of claim 6, wherein the first instructions executable by the one or more first processors are configured for processing the pixel width measure and pixel height measure to estimate meeting room coordinates for each meeting participant identified by a corresponding head bounding box based on mathematical computations which use a vertical angular field of view, a horizontal angular field of view, a vertical resolution field of view, and a horizontal resolution field of view for an input camera device which captures the input frame image.

9. The system of claim 6, wherein the first instructions executable by the one or more first processors are configured to detect a human head by:

applying image pre-processing to the input frame image to generate a pre-processed frame image; and applying a machine learning human head detector model to each pre-processed frame image to generate an output tensor for each detected human head.

10. The system of claim 9, wherein the first instructions executable by the one or more first processors are configured generate the head bounding box by applying image post-processing to convert each output tensor to a head bounding box which surrounds a corresponding detected human head.

11. The system of claim 6, wherein the first instructions executable by the one or more first processors are configured to compute or retrieve one or more reverse lookup tables for processing the pixel width measure and pixel height measure to generate meeting room coordinates, where the one or more reverse lookup tables comprise:

a head height reverse lookup table comprising a plurality of head height pixel values calculated for a predetermined head height at a plurality of room pan angles, where each head height pixel value is indexed by a meeting room width coordinate and a meeting room depth coordinate; and a head width reverse lookup table comprising a plurality of head width pixel values calculated for a predetermined head width at a plurality of room pan angles, where each head width pixel value is indexed by a corresponding meeting room width coordinate and a meeting room depth coordinate.

12. The system of claim 11, where the plurality of head height pixel values are computed as:

$$\left(\frac{2\arctan\left(\frac{v}{\sqrt[2]{Y_{ROOM}^2 + X_{ROOM}^2}}\right)}{\text{Vertical}_{FOV_{Angle}}}\right) \times \text{Vertical\_FOV\_Pixels},$$

where $y_{ROOM}$ is meeting room depth coordinate, where $x_{ROOM}$ is meeting room width coordinate, where V is the predetermined head height, where Vertical_FOV_Angle is an angular vertical field of view measure for a camera, and where Vertical_FOV_Pixels is a vertical field of view pixel resolution measure for the camera.

13. The system of claim 6, wherein the first instructions executable by the one or more first processors are configured to generate, from each detected human head, a head bounding box data structure comprising the first pair of image plane coordinates, the head box width dimension, and the head box height dimension for a corresponding head bounding box.

* * * * *